United States Patent
Sood et al.

(10) Patent No.: US 11,968,280 B1
(45) Date of Patent: Apr. 23, 2024

(54) CONTROLLING INGESTION OF STREAMING DATA TO SERVERLESS FUNCTION EXECUTIONS

(71) Applicant: Amazon Technologies, Inc., Seattle, WA (US)

(72) Inventors: Vinayak Sood, Seattle, WA (US); Mandakini Saroop, Seattle, WA (US); Shu Song, Seattle, WA (US); Tejas Mahadeo Ghadge, Seattle, WA (US); Tyson Charles Olychuck, Seattle, WA (US); Dinesh Saheblal Gupta, Bothell, WA (US); Jia Liu, Campbell, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/456,546

(22) Filed: Nov. 24, 2021

(51) Int. Cl.
   *G06F 8/33* (2018.01)
   *G06F 8/41* (2018.01)
   (Continued)

(52) U.S. Cl.
   CPC ............ *H04L 67/60* (2022.05); *H04L 67/133* (2022.05); *H04L 67/564* (2022.05); *H04L 67/5651* (2022.05)

(58) Field of Classification Search
   CPC ..... H04L 67/60; H04L 67/133; H04L 67/564; H04L 67/5651
   See application file for complete search history.

(56) References Cited

U.S. PATENT DOCUMENTS

| 4,949,254 A | 8/1990 | Shorter |
| 5,283,888 A | 2/1994 | Dao et al. |

(Continued)

FOREIGN PATENT DOCUMENTS

| CA | 2962633 C | 4/2012 |
| CA | 2975522 A1 | 8/2016 |

(Continued)

OTHER PUBLICATIONS

Anonymous: "Amazon Elastic Compute Cloud User Guide for Linux Instances—first 400 pages of 795," Apr. 8, 2016 (Apr. 8, 2016_, XP055946665, Retrieved from the Internet: URL:https://web.archive.org/web/20160408211543if_/http://docs.aws.amazon.com/AWSEC2/latest/UserGuide/ec2-ug.pdf (retrieved on Jul. 27, 2022] 795 pages.

(Continued)

*Primary Examiner* — Schquita D Goodwin
(74) *Attorney, Agent, or Firm* — Knobbe, Martens, Olson & Bear, LLP

(57) ABSTRACT

Systems and methods are described controlling ingestion of data items within a data stream by executions of a serverless function on a serverless compute system. A poller device can act as an intermediary between the data stream and the serverless function, iteratively retrieving data items from the data stream and passing them in invocations of the serverless function. To allow for fine-grained control of ingestion without requiring implementation of complex logic at the poller device, the poller device can enable the serverless function to pass instructions controlling subsequent operation of the poller device. Each execution of the serverless function may determine whether subsequent operation of the poller device should be altered, and if so, instruct the poller device accordingly. The poller device can then modify its operation pursuant to the instructions, enabling highly granular control of streaming data ingestion without inhibiting existing benefits of serverless computing.

22 Claims, 5 Drawing Sheets

(51) Int. Cl.
   *H04L 67/133* (2022.01)
   *H04L 67/564* (2022.01)
   *H04L 67/5651* (2022.01)
   *H04L 67/60* (2022.01)

(56) References Cited

U.S. PATENT DOCUMENTS

| | | |
|---|---|---|
| 5,835,764 A | 11/1998 | Platt et al. |
| 5,970,488 A | 10/1999 | Crowe et al. |
| 5,983,197 A | 11/1999 | Enta |
| 6,237,005 B1 | 5/2001 | Griffin |
| 6,260,058 B1 | 7/2001 | Hoenninger et al. |
| 6,385,636 B1 | 5/2002 | Suzuki |
| 6,463,509 B1 | 10/2002 | Teoman et al. |
| 6,501,736 B1 | 12/2002 | Smolik et al. |
| 6,523,035 B1 | 2/2003 | Fleming et al. |
| 6,549,936 B1 | 4/2003 | Hirabayashi |
| 6,708,276 B1 | 3/2004 | Yarsa et al. |
| 7,036,121 B1 | 4/2006 | Casabona et al. |
| 7,308,463 B2 | 12/2007 | Taulbee et al. |
| 7,340,522 B1 | 3/2008 | Basu et al. |
| 7,360,215 B2 | 4/2008 | Kraiss et al. |
| 7,558,719 B1 | 7/2009 | Donlin |
| 7,577,722 B1 | 8/2009 | Khandekar et al. |
| 7,590,806 B2 | 9/2009 | Harris et al. |
| 7,640,574 B1 | 12/2009 | Kim et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,831,464 B1 | 11/2010 | Nichols et al. |
| 7,870,153 B2 | 1/2011 | Croft et al. |
| 7,886,021 B2 | 2/2011 | Scheifler et al. |
| 7,949,677 B2 | 5/2011 | Croft et al. |
| 7,954,150 B2 | 5/2011 | Croft et al. |
| 8,010,679 B2 | 8/2011 | Low et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,201,026 B1 | 6/2012 | Bornstein et al. |
| 8,209,695 B1 | 6/2012 | Pruyne et al. |
| 8,219,987 B1 | 7/2012 | Vlaovic et al. |
| 8,296,267 B2 | 10/2012 | Cahill et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,392,558 B1 | 3/2013 | Ahuja et al. |
| 8,402,514 B1 | 3/2013 | Thompson et al. |
| 8,417,723 B1 | 4/2013 | Lissack et al. |
| 8,429,282 B1 | 4/2013 | Ahuja |
| 8,448,165 B1 | 5/2013 | Conover |
| 8,479,195 B2 | 7/2013 | Adams et al. |
| 8,490,088 B2 | 7/2013 | Tang |
| 8,555,281 B1 | 10/2013 | Van Dijk et al. |
| 8,560,699 B1 | 10/2013 | Theimer et al. |
| 8,566,835 B2 | 10/2013 | Wang et al. |
| 8,601,323 B2 | 12/2013 | Tsantilis |
| 8,613,070 B1 | 12/2013 | Borzycki et al. |
| 8,615,589 B1 | 12/2013 | Adogla et al. |
| 8,631,130 B2 | 1/2014 | Jackson |
| 8,667,471 B2 | 3/2014 | Wintergerst et al. |
| 8,677,359 B1 | 3/2014 | Cavage et al. |
| 8,694,996 B2 | 4/2014 | Cawlfield et al. |
| 8,700,768 B2 | 4/2014 | Benari |
| 8,713,093 B1 | 4/2014 | Upadhyay et al. |
| 8,719,415 B1 | 5/2014 | Sirota et al. |
| 8,725,702 B1 | 5/2014 | Raman et al. |
| 8,756,322 B1 | 6/2014 | Lynch |
| 8,756,696 B1 | 6/2014 | Miller |
| 8,763,091 B1 | 6/2014 | Singh et al. |
| 8,769,519 B2 | 7/2014 | Leitman et al. |
| 8,793,676 B2 | 7/2014 | Quinn et al. |
| 8,799,236 B1 | 8/2014 | Azari et al. |
| 8,799,879 B2 | 8/2014 | Wright et al. |
| 8,806,266 B1 | 8/2014 | Qu et al. |
| 8,806,468 B2 | 8/2014 | Meijer et al. |
| 8,806,644 B1 | 8/2014 | McCorkendale et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,869,300 B2 | 10/2014 | Singh et al. |
| 8,874,952 B2 | 10/2014 | Tameshige et al. |
| 8,904,008 B2 | 12/2014 | Calder et al. |
| 8,949,457 B1 | 2/2015 | Theroux et al. |
| 8,966,495 B2 | 2/2015 | Kulkarni |
| 8,972,980 B2 | 3/2015 | Banga et al. |
| 8,990,807 B2 | 3/2015 | Wu et al. |
| 8,997,093 B2 | 3/2015 | Dimitrov |
| 9,002,871 B2 | 4/2015 | Bulkowski et al. |
| 9,021,501 B2 | 4/2015 | Li et al. |
| 9,026,658 B2 | 5/2015 | Xu et al. |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,086,924 B2 | 7/2015 | Barsness et al. |
| 9,092,837 B2 | 7/2015 | Bala et al. |
| 9,098,528 B2 | 8/2015 | Wang |
| 9,104,477 B2 | 8/2015 | Kodialam et al. |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,116,733 B2 | 8/2015 | Banga et al. |
| 9,130,900 B2 | 9/2015 | Tran |
| 9,141,410 B2 | 9/2015 | Leafe et al. |
| 9,146,764 B1 | 9/2015 | Wagner |
| 9,152,406 B2 | 10/2015 | De et al. |
| 9,154,955 B1 | 10/2015 | Bertz et al. |
| 9,164,754 B1 | 10/2015 | Pohlack |
| 9,176,871 B1 | 11/2015 | Serlet |
| 9,183,019 B2 | 11/2015 | Kruglick |
| 9,189,778 B1 | 11/2015 | Sh. Al-Rashidi |
| 9,195,520 B2 | 11/2015 | Turk |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,405,582 B2 | 8/2016 | Fuller et al. |
| 9,411,645 B1 | 8/2016 | Duan et al. |
| 9,413,626 B2 | 8/2016 | Reque et al. |
| 9,417,918 B2 | 8/2016 | Chin et al. |
| 9,430,290 B1 | 8/2016 | Gupta et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,471,776 B2 | 10/2016 | Gu et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,563,613 B1 | 2/2017 | Dinkel et al. |

(56) References Cited

U.S. PATENT DOCUMENTS

| | | | |
|---|---|---|---|
| 9,565,190 B1 | 2/2017 | Telvik et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,613,127 B1 | 4/2017 | Rus et al. |
| 9,626,204 B1 | 4/2017 | Banga et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,720,661 B2 | 8/2017 | Gschwind et al. |
| 9,720,662 B2 | 8/2017 | Gschwind et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,798,831 B2 | 10/2017 | Chattopadhyay et al. |
| 9,799,017 B1 | 10/2017 | Vermeulen et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,898,393 B2 | 2/2018 | Moorthi et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 9,983,982 B1 | 5/2018 | Kumar et al. |
| 10,002,026 B1 | 6/2018 | Wagner |
| 10,002,036 B2 | 6/2018 | Fuchs et al. |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,655 B2 | 12/2018 | Tuch et al. |
| 10,162,672 B2 | 12/2018 | Wagner et al. |
| 10,162,688 B2 | 12/2018 | Wagner |
| 10,191,861 B1 | 1/2019 | Steinberg |
| 10,193,839 B2 | 1/2019 | Tandon et al. |
| 10,198,298 B2 | 2/2019 | Bishop et al. |
| 10,203,990 B2 | 2/2019 | Wagner et al. |
| 10,248,467 B2 | 4/2019 | Wisniewski et al. |
| 10,255,090 B2 | 4/2019 | Tuch et al. |
| 10,277,708 B2 | 4/2019 | Wagner et al. |
| 10,282,229 B2 | 5/2019 | Wagner et al. |
| 10,303,492 B1 | 5/2019 | Wagner et al. |
| 10,331,462 B1 | 6/2019 | Varda et al. |
| 10,346,625 B2 | 7/2019 | Anderson et al. |
| 10,353,678 B1 | 7/2019 | Wagner |
| 10,353,746 B2 | 7/2019 | Reque et al. |
| 10,360,025 B2 | 7/2019 | Foskett et al. |
| 10,360,067 B1 | 7/2019 | Wagner |
| 10,365,985 B2 | 7/2019 | Wagner |
| 10,387,177 B2 | 8/2019 | Wagner et al. |
| 10,402,231 B2 | 9/2019 | Marriner et al. |
| 10,423,158 B1 | 9/2019 | Hadlich |
| 10,437,629 B2 | 10/2019 | Wagner et al. |
| 10,445,140 B1 | 10/2019 | Sagar et al. |
| 10,459,822 B1 | 10/2019 | Gondi |
| 10,496,547 B1 | 12/2019 | Naenko et al. |
| 10,503,626 B2 | 12/2019 | Idicula et al. |
| 10,528,390 B2 | 1/2020 | Brooker et al. |
| 10,531,226 B1 | 1/2020 | Wang et al. |
| 10,552,193 B2 | 2/2020 | Wagner et al. |
| 10,552,442 B1 | 2/2020 | Lusk et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,608,973 B2 | 3/2020 | Kuo et al. |
| 10,615,984 B1 | 4/2020 | Wang |
| 10,623,476 B2 | 4/2020 | Thompson |
| 10,637,817 B2 | 4/2020 | Kuo et al. |
| 10,649,749 B1 | 5/2020 | Brooker et al. |
| 10,649,792 B1 | 5/2020 | Kulchytskyy et al. |
| 10,650,156 B2 | 5/2020 | Anderson et al. |
| 10,652,350 B2 | 5/2020 | Wozniak |
| 10,678,522 B1 | 6/2020 | Yerramreddy et al. |
| 10,686,605 B2 | 6/2020 | Chhabra et al. |
| 10,691,498 B2 | 6/2020 | Wagner |
| 10,713,080 B1 | 7/2020 | Brooker et al. |
| 10,719,367 B1 | 7/2020 | Kim et al. |
| 10,725,752 B1 | 7/2020 | Wagner et al. |
| 10,725,826 B1 | 7/2020 | Sagar et al. |
| 10,733,085 B1 | 8/2020 | Wagner |
| 10,754,701 B1 | 8/2020 | Wagner |
| 10,776,091 B1 | 9/2020 | Wagner et al. |
| 10,776,171 B2 | 9/2020 | Wagner et al. |
| 10,817,331 B2 | 10/2020 | Mullen et al. |
| 10,817,346 B1 | 10/2020 | Culp et al. |
| 10,824,484 B2 | 11/2020 | Wagner et al. |
| 10,831,898 B1 | 11/2020 | Wagner |
| 10,846,117 B1 | 11/2020 | Steinberg |
| 10,853,112 B2 | 12/2020 | Wagner et al. |
| 10,853,115 B2 | 12/2020 | Mullen et al. |
| 10,884,722 B2 | 1/2021 | Brooker et al. |
| 10,884,787 B1 | 1/2021 | Wagner et al. |
| 10,884,802 B2 | 1/2021 | Wagner et al. |
| 10,884,812 B2 | 1/2021 | Brooker et al. |
| 10,891,145 B2 | 1/2021 | Wagner et al. |
| 10,915,371 B2 | 2/2021 | Wagner et al. |
| 10,942,795 B1 | 3/2021 | Yanacek et al. |
| 10,949,237 B2 | 3/2021 | Piwonka et al. |
| 10,956,185 B2 | 3/2021 | Wagner |
| 10,956,244 B1* | 3/2021 | Cho .................... G06F 8/65 |
| 11,010,188 B1 | 5/2021 | Brooker et al. |
| 11,016,815 B2 | 5/2021 | Wisniewski et al. |
| 11,044,198 B1* | 6/2021 | Ahn .................. H04L 47/746 |
| 11,082,333 B1 | 8/2021 | Lam et al. |
| 11,095,706 B1 | 8/2021 | Ankam et al. |
| 11,099,870 B1 | 8/2021 | Brooker et al. |
| 11,099,917 B2 | 8/2021 | Hussels et al. |
| 11,115,404 B2 | 9/2021 | Siefker et al. |
| 11,119,809 B1 | 9/2021 | Brooker et al. |
| 11,119,813 B1 | 9/2021 | Kasaragod |
| 11,119,826 B2 | 9/2021 | Yanacek et al. |
| 11,126,469 B2 | 9/2021 | Reque et al. |
| 11,132,213 B1 | 9/2021 | Wagner et al. |
| 11,146,569 B1 | 10/2021 | Brooker et al. |
| 11,159,528 B2 | 10/2021 | Siefker et al. |
| 11,188,391 B1 | 11/2021 | Sule |
| 11,190,609 B2 | 11/2021 | Siefker et al. |
| 11,231,955 B1 | 1/2022 | Shahane et al. |
| 11,243,819 B1 | 2/2022 | Wagner |
| 11,243,953 B2 | 2/2022 | Wagner et al. |
| 11,263,034 B2 | 3/2022 | Wagner et al. |
| 11,327,992 B1* | 5/2022 | Batsakis ............. H04L 63/083 |
| 11,354,169 B2 | 6/2022 | Marriner et al. |
| 11,360,793 B2 | 6/2022 | Wagner et al. |
| 11,392,497 B1 | 7/2022 | Brooker et al. |

(56) References Cited

U.S. PATENT DOCUMENTS

| | | |
|---|---|---|
| 11,461,124 B2 | 10/2022 | Wagner et al. |
| 11,467,890 B2 | 10/2022 | Wagner |
| 11,550,713 B1 | 1/2023 | Piwonka et al. |
| 11,561,811 B2 | 1/2023 | Wagner |
| 11,593,270 B1 | 2/2023 | Brooker et al. |
| 11,714,675 B2 | 8/2023 | Brooker et al. |
| 11,836,516 B2 | 12/2023 | Brooker et al. |
| 11,861,386 B1 | 1/2024 | Varun Mukesh et al. |
| 2001/0044817 A1 | 11/2001 | Asano et al. |
| 2002/0083012 A1 | 6/2002 | Bush et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0149801 A1 | 8/2003 | Kushnirskiy |
| 2003/0177186 A1 | 9/2003 | Goodman et al. |
| 2003/0191795 A1 | 10/2003 | Bernardin et al. |
| 2003/0208569 A1 | 11/2003 | O'Brien et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2005/0262183 A1 | 11/2005 | Colrain et al. |
| 2005/0262512 A1 | 11/2005 | Schmidt et al. |
| 2006/0010440 A1 | 1/2006 | Anderson et al. |
| 2006/0015740 A1 | 1/2006 | Kramer |
| 2006/0031448 A1 | 2/2006 | Chu et al. |
| 2006/0036941 A1 | 2/2006 | Neil |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0218601 A1 | 9/2006 | Michel |
| 2006/0242647 A1 | 10/2006 | Kimbrel et al. |
| 2006/0242709 A1 | 10/2006 | Seinfeld et al. |
| 2006/0248195 A1 | 11/2006 | Toumura et al. |
| 2006/0259763 A1 | 11/2006 | Cooperstein et al. |
| 2006/0282330 A1 | 12/2006 | Frank et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0067321 A1 | 3/2007 | Bissett et al. |
| 2007/0076244 A1 | 4/2007 | Suzuki et al. |
| 2007/0094396 A1 | 4/2007 | Takano et al. |
| 2007/0101325 A1 | 5/2007 | Bystricky et al. |
| 2007/0112864 A1 | 5/2007 | Ben-Natan |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2007/0300297 A1 | 12/2007 | Dawson et al. |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0178278 A1 | 7/2008 | Grinstein et al. |
| 2008/0184340 A1 | 7/2008 | Nakamura et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2008/0244547 A1 | 10/2008 | Wintergerst et al. |
| 2008/0288940 A1 | 11/2008 | Adams et al. |
| 2008/0307098 A1 | 12/2008 | Kelly |
| 2009/0006897 A1 | 1/2009 | Sarsfield |
| 2009/0013153 A1 | 1/2009 | Hilton |
| 2009/0018892 A1 | 1/2009 | Grey et al. |
| 2009/0025009 A1 | 1/2009 | Brunswig et al. |
| 2009/0034537 A1 | 2/2009 | Colrain et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0158407 A1 | 6/2009 | Nicodemus et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-Yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2009/0307430 A1 | 12/2009 | Bruening et al. |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0037031 A1 | 2/2010 | DeSantis et al. |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0083248 A1 | 4/2010 | Wood et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0146004 A1 | 6/2010 | Sim-Tang |
| 2010/0169477 A1 | 7/2010 | Stienhans et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0298011 A1 | 11/2010 | Pelley et al. |

(56) References Cited

U.S. PATENT DOCUMENTS

| | | |
|---|---|---|
| 2010/0299541 A1 | 11/2010 | Ishikawa et al. |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0004687 A1 | 1/2011 | Takemura |
| 2011/0010690 A1 | 1/2011 | Howard et al. |
| 2011/0010722 A1 | 1/2011 | Matsuyama |
| 2011/0023026 A1 | 1/2011 | Oza |
| 2011/0029970 A1 | 2/2011 | Arasaratnam |
| 2011/0029984 A1 | 2/2011 | Norman et al. |
| 2011/0035785 A1 | 2/2011 | Mihara |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0208866 A1 | 8/2011 | Marmolejo-Meillon et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0258603 A1 | 10/2011 | Wisnovsky et al. |
| 2011/0265067 A1 | 10/2011 | Schulte et al. |
| 2011/0265069 A1 | 10/2011 | Fee et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0060207 A1 | 3/2012 | Mardikar et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0110603 A1 | 5/2012 | Kaneko et al. |
| 2012/0124563 A1 | 5/2012 | Chung et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0173709 A1 | 7/2012 | Li et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1 | 8/2012 | Glaser et al. |
| 2012/0222038 A1 | 8/2012 | Katragadda et al. |
| 2012/0233464 A1 | 9/2012 | Miller et al. |
| 2012/0254193 A1 | 10/2012 | Chattopadhyay et al. |
| 2012/0324052 A1 | 12/2012 | Paleja et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132283 A1 | 5/2013 | Hayhow et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0145354 A1 | 6/2013 | Bruening et al. |
| 2013/0151587 A1 | 6/2013 | Takeshima et al. |
| 2013/0151648 A1 | 6/2013 | Luna |
| 2013/0151684 A1 | 6/2013 | Forsman et al. |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0181998 A1 | 7/2013 | Malakapalli et al. |
| 2013/0185719 A1 | 7/2013 | Kar et al. |
| 2013/0185729 A1 | 7/2013 | Vasic et al. |
| 2013/0191847 A1 | 7/2013 | Sirota et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0205114 A1 | 8/2013 | Badam et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232190 A1 | 9/2013 | Miller et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0332660 A1 | 12/2013 | Talagala et al. |
| 2013/0339950 A1 | 12/2013 | Ramarathinam et al. |
| 2013/0346470 A1 | 12/2013 | Obstfeld et al. |

(56) References Cited

U.S. PATENT DOCUMENTS

| | | |
|---|---|---|
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0047437 A1 | 2/2014 | Wu et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0164551 A1 | 6/2014 | Resch et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0229942 A1 | 8/2014 | Wiseman et al. |
| 2014/0245297 A1 | 8/2014 | Hackett |
| 2014/0258777 A1 | 9/2014 | Cheriton |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0330936 A1 | 11/2014 | Factor et al. |
| 2014/0331222 A1 | 11/2014 | Zheng |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0351674 A1 | 11/2014 | Grube et al. |
| 2014/0359093 A1 | 12/2014 | Raju et al. |
| 2014/0359608 A1 | 12/2014 | Tsirkin et al. |
| 2014/0365781 A1 | 12/2014 | Dmitrienko et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0006487 A1 | 1/2015 | Yang et al. |
| 2015/0025989 A1 | 1/2015 | Dunstan |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0046971 A1 | 2/2015 | Huh et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0074675 A1 | 3/2015 | Qi et al. |
| 2015/0081885 A1 | 3/2015 | Thomas et al. |
| 2015/0095822 A1 | 4/2015 | Feis et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1 | 5/2015 | Chin et al. |
| 2015/0146716 A1 | 5/2015 | Olivier et al. |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178019 A1 | 6/2015 | Hegdal et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0206139 A1 | 7/2015 | Lea |
| 2015/0212818 A1 | 7/2015 | Gschwind et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256514 A1 | 9/2015 | Laivand et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0271073 A1 | 9/2015 | Saladi et al. |
| 2015/0271280 A1 | 9/2015 | Zhang et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0319174 A1 | 11/2015 | Hayton et al. |
| 2015/0324174 A1 | 11/2015 | Bromley et al. |
| 2015/0324182 A1 | 11/2015 | Barros et al. |
| 2015/0324210 A1 | 11/2015 | Carlson |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0021112 A1 | 1/2016 | Katieb |
| 2016/0026486 A1 | 1/2016 | Abdallah |
| 2016/0048606 A1 | 2/2016 | Rubinstein et al. |

(56) References Cited

U.S. PATENT DOCUMENTS

| | | |
|---|---|---|
| 2016/0070714 A1 | 3/2016 | D'Sa et al. |
| 2016/0072727 A1 | 3/2016 | Leafe et al. |
| 2016/0072781 A1 | 3/2016 | Zhang et al. |
| 2016/0077901 A1 | 3/2016 | Roth et al. |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0110188 A1 | 4/2016 | Verde et al. |
| 2016/0117163 A1 | 4/2016 | Fukui et al. |
| 2016/0117254 A1 | 4/2016 | Susarla et al. |
| 2016/0119289 A1 | 4/2016 | Jain et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0188367 A1 | 6/2016 | Zeng |
| 2016/0191420 A1 | 6/2016 | Nagarajan et al. |
| 2016/0198235 A1 | 7/2016 | Liu et al. |
| 2016/0203219 A1 | 7/2016 | Hoch et al. |
| 2016/0212007 A1 | 7/2016 | Alatorre et al. |
| 2016/0226955 A1 | 8/2016 | Moorthi et al. |
| 2016/0282930 A1 | 9/2016 | Ramachandran et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0315910 A1 | 10/2016 | Kaufman |
| 2016/0350099 A1 | 12/2016 | Suparna et al. |
| 2016/0350124 A1 | 12/2016 | Gschwind et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378525 A1 | 12/2016 | Bjorkengren |
| 2016/0378547 A1 | 12/2016 | Brouwer et al. |
| 2016/0378554 A1 | 12/2016 | Gummaraju et al. |
| 2017/0004169 A1 | 1/2017 | Merrill et al. |
| 2017/0032000 A1 | 2/2017 | Sharma et al. |
| 2017/0041144 A1 | 2/2017 | Krapf et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1 | 3/2017 | Biduraju |
| 2017/0085591 A1 | 3/2017 | Ganda et al. |
| 2017/0091235 A1 | 3/2017 | Yammine et al. |
| 2017/0091296 A1 | 3/2017 | Beard et al. |
| 2017/0093684 A1 | 3/2017 | Jayaraman et al. |
| 2017/0093920 A1 | 3/2017 | Ducatel et al. |
| 2017/0134519 A1 | 5/2017 | Chen et al. |
| 2017/0142099 A1 | 5/2017 | Hinohara et al. |
| 2017/0147656 A1 | 5/2017 | Choudhary et al. |
| 2017/0149740 A1 | 5/2017 | Mansour et al. |
| 2017/0153965 A1 | 6/2017 | Nitta et al. |
| 2017/0161059 A1 | 6/2017 | Wood et al. |
| 2017/0177266 A1 | 6/2017 | Doerner et al. |
| 2017/0177441 A1 | 6/2017 | Chow |
| 2017/0177854 A1 | 6/2017 | Gligor et al. |
| 2017/0188213 A1 | 6/2017 | Nirantar et al. |
| 2017/0192825 A1 | 7/2017 | Biberman et al. |
| 2017/0221000 A1 | 8/2017 | Anand |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0286187 A1 | 10/2017 | Chen et al. |
| 2017/0288878 A1 | 10/2017 | Lee et al. |
| 2017/0308520 A1 | 10/2017 | Beahan, Jr. et al. |
| 2017/0315163 A1 | 11/2017 | Wang et al. |
| 2017/0322824 A1 | 11/2017 | Reuther et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1 | 12/2017 | Fontoura et al. |
| 2017/0371720 A1 | 12/2017 | Basu et al. |
| 2017/0372142 A1 | 12/2017 | Bilobrov |
| 2018/0004555 A1 | 1/2018 | Ramanathan et al. |
| 2018/0004556 A1 | 1/2018 | Marriner et al. |
| 2018/0004575 A1 | 1/2018 | Marriner et al. |
| 2018/0032410 A1 | 2/2018 | Kang et al. |
| 2018/0046453 A1 | 2/2018 | Nair et al. |
| 2018/0046482 A1 | 2/2018 | Karve et al. |
| 2018/0060132 A1 | 3/2018 | Maru et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0067873 A1 | 3/2018 | Pikhur et al. |
| 2018/0069702 A1 | 3/2018 | Ayyadevara et al. |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0113770 A1 | 4/2018 | Hasanov et al. |
| 2018/0113793 A1 | 4/2018 | Fink et al. |
| 2018/0121665 A1 | 5/2018 | Anderson et al. |
| 2018/0129684 A1 | 5/2018 | Wilson et al. |
| 2018/0144263 A1 | 5/2018 | Saxena et al. |
| 2018/0150339 A1 | 5/2018 | Pan et al. |
| 2018/0152401 A1 | 5/2018 | Tandon et al. |
| 2018/0152405 A1 | 5/2018 | Kuo et al. |
| 2018/0152406 A1 | 5/2018 | Kuo et al. |
| 2018/0165110 A1 | 6/2018 | Htay |
| 2018/0192101 A1 | 7/2018 | Bilobrov |
| 2018/0225096 A1 | 8/2018 | Mishra et al. |
| 2018/0227300 A1 | 8/2018 | Nakic et al. |
| 2018/0239636 A1 | 8/2018 | Arora et al. |
| 2018/0253333 A1 | 9/2018 | Gupta |
| 2018/0255137 A1 | 9/2018 | Hu et al. |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0300111 A1 | 10/2018 | Bhat et al. |
| 2018/0314845 A1 | 11/2018 | Anderson et al. |
| 2018/0316552 A1 | 11/2018 | Subramani Nadar et al. |
| 2018/0341504 A1 | 11/2018 | Kissell |
| 2018/0365422 A1 | 12/2018 | Callaghan et al. |
| 2018/0367517 A1 | 12/2018 | Tus |
| 2018/0375781 A1 | 12/2018 | Chen et al. |
| 2019/0004866 A1 | 1/2019 | Du et al. |
| 2019/0018715 A1 | 1/2019 | Behrendt et al. |
| 2019/0028552 A1 | 1/2019 | Johnson, II et al. |
| 2019/0034095 A1 | 1/2019 | Singh et al. |
| 2019/0043231 A1 | 2/2019 | Uzgin et al. |
| 2019/0068622 A1 | 2/2019 | Lin et al. |
| 2019/0072529 A1 | 3/2019 | Andrawes et al. |
| 2019/0073430 A1 | 3/2019 | Webster |
| 2019/0079751 A1 | 3/2019 | Foskett et al. |
| 2019/0102278 A1 | 4/2019 | Gahlin et al. |
| 2019/0140831 A1 | 5/2019 | De Lima Junior et al. |
| 2019/0141015 A1 | 5/2019 | Nellen |
| 2019/0147085 A1 | 5/2019 | Pal et al. |
| 2019/0147515 A1 | 5/2019 | Hurley et al. |
| 2019/0171423 A1 | 6/2019 | Mishra et al. |
| 2019/0179678 A1 | 6/2019 | Banerjee et al. |
| 2019/0179725 A1 | 6/2019 | Mital et al. |
| 2019/0180036 A1 | 6/2019 | Shukla |
| 2019/0188288 A1 | 6/2019 | Holm et al. |
| 2019/0196884 A1 | 6/2019 | Wagner |
| 2019/0235848 A1 | 8/2019 | Swiecki et al. |
| 2019/0238590 A1 | 8/2019 | Talukdar et al. |
| 2019/0250937 A1 | 8/2019 | Thomas et al. |
| 2019/0268152 A1 | 8/2019 | Sandoval et al. |
| 2019/0278938 A1 | 9/2019 | Greene et al. |
| 2019/0286475 A1 | 9/2019 | Mani |
| 2019/0286492 A1 | 9/2019 | Gulsvig Wood et al. |
| 2019/0303117 A1 | 10/2019 | Kocberber et al. |
| 2019/0306692 A1 | 10/2019 | Garty et al. |

(56) References Cited

U.S. PATENT DOCUMENTS

| | | |
|---|---|---|
| 2019/0311115 A1 | 10/2019 | Lavi et al. |
| 2019/0318312 A1 | 10/2019 | Foskett et al. |
| 2019/0320038 A1* | 10/2019 | Walsh .................... H04L 65/65 |
| 2019/0324813 A1 | 10/2019 | Bogineni et al. |
| 2019/0339955 A1 | 11/2019 | Kuo et al. |
| 2019/0361802 A1 | 11/2019 | Li et al. |
| 2019/0363885 A1 | 11/2019 | Schiavoni et al. |
| 2019/0370113 A1 | 12/2019 | Zhang et al. |
| 2020/0007456 A1 | 1/2020 | Greenstein et al. |
| 2020/0026527 A1 | 1/2020 | Xu et al. |
| 2020/0028936 A1 | 1/2020 | Gupta et al. |
| 2020/0034471 A1 | 1/2020 | Danilov et al. |
| 2020/0057680 A1 | 2/2020 | Marriner et al. |
| 2020/0065079 A1 | 2/2020 | Kocberber et al. |
| 2020/0073770 A1 | 3/2020 | Mortimore, Jr. et al. |
| 2020/0073987 A1 | 3/2020 | Perumala et al. |
| 2020/0081745 A1 | 3/2020 | Cybulski et al. |
| 2020/0110691 A1 | 4/2020 | Bryant et al. |
| 2020/0120120 A1 | 4/2020 | Cybulski |
| 2020/0134030 A1 | 4/2020 | Natanzon et al. |
| 2020/0136933 A1 | 4/2020 | Raskar |
| 2020/0153798 A1 | 5/2020 | Liebherr |
| 2020/0153897 A1 | 5/2020 | Mestery et al. |
| 2020/0167208 A1 | 5/2020 | Floes et al. |
| 2020/0186445 A1 | 6/2020 | Govindaraju et al. |
| 2020/0192646 A1 | 6/2020 | Yerramreddy et al. |
| 2020/0213151 A1 | 7/2020 | Srivatsan et al. |
| 2020/0241930 A1 | 7/2020 | Garg et al. |
| 2020/0327236 A1 | 10/2020 | Pratt et al. |
| 2020/0341799 A1 | 10/2020 | Wagner et al. |
| 2020/0348979 A1 | 11/2020 | Calmon |
| 2020/0349067 A1 | 11/2020 | Syamala et al. |
| 2020/0366587 A1 | 11/2020 | White et al. |
| 2020/0401455 A1 | 12/2020 | Church et al. |
| 2020/0412538 A1 | 12/2020 | Rosado |
| 2021/0019056 A1 | 1/2021 | Mangione-Tran |
| 2021/0042160 A1 | 2/2021 | Alamouti et al. |
| 2021/0081233 A1 | 3/2021 | Mullen et al. |
| 2021/0117217 A1 | 4/2021 | Croteau et al. |
| 2021/0117534 A1 | 4/2021 | Maximov et al. |
| 2021/0124822 A1 | 4/2021 | Tiwary et al. |
| 2021/0176333 A1* | 6/2021 | Coleman ............. G06F 16/2308 |
| 2021/0232415 A1 | 7/2021 | Wagner et al. |
| 2021/0233045 A1 | 7/2021 | Singh et al. |
| 2021/0294646 A1 | 9/2021 | Hassaan et al. |
| 2021/0303720 A1 | 9/2021 | Creenaune et al. |
| 2021/0314250 A1 | 10/2021 | Laplante et al. |
| 2021/0342145 A1 | 11/2021 | Miller et al. |
| 2021/0342329 A1 | 11/2021 | Padmanabhan |
| 2021/0389963 A1 | 12/2021 | Wagner |
| 2022/0004423 A1 | 1/2022 | Brooker et al. |
| 2022/0012083 A1 | 1/2022 | Brooker et al. |
| 2022/0200993 A1 | 6/2022 | Smith |
| 2022/0201041 A1 | 6/2022 | Keiser, Jr. et al. |
| 2022/0214863 A1* | 7/2022 | Clement ................ G06N 3/044 |
| 2022/0391238 A1 | 12/2022 | Wagner |
| 2023/0024699 A1* | 1/2023 | Bayoumi ............. H04N 19/177 |
| 2023/0188516 A1 | 6/2023 | Danilov |

FOREIGN PATENT DOCUMENTS

| | | |
|---|---|---|
| CN | 1341238 A | 3/2002 |
| CN | 101002170 A | 7/2007 |
| CN | 101267334 A | 9/2008 |
| CN | 101345757 A | 1/2009 |
| CN | 101496005 A | 7/2009 |
| CN | 101627388 A | 1/2010 |
| CN | 101640700 A | 2/2010 |
| CN | 101764824 A | 6/2010 |
| CN | 102171712 A | 8/2011 |
| CN | 102246152 A | 11/2011 |
| CN | 102365858 A | 2/2012 |
| CN | 102420846 A | 4/2012 |
| CN | 102761549 A | 10/2012 |
| CN | 103098027 A | 5/2013 |
| CN | 103140828 A | 6/2013 |
| CN | 103384237 A | 11/2013 |
| CN | 103731427 A | 4/2014 |
| CN | 104111848 A | 10/2014 |
| CN | 104160378 A | 11/2014 |
| CN | 104243479 A | 12/2014 |
| CN | 104903854 A | 9/2015 |
| CN | 105122243 A | 12/2015 |
| CN | 105956000 A | 9/2016 |
| CN | 106921651 A | 7/2017 |
| CN | 107534672 A | 1/2018 |
| CN | 108885568 A | 11/2018 |
| CN | 109478134 A | 3/2019 |
| CN | 109564525 A | 4/2019 |
| CN | 112513813 A | 3/2021 |
| CN | 109564525 B | 5/2023 |
| EP | 2663052 A1 | 11/2013 |
| EP | 3201762 A1 | 8/2017 |
| EP | 3254434 A1 | 12/2017 |
| EP | 3356938 A1 | 8/2018 |
| EP | 3201768 B1 | 12/2019 |
| EP | 3811209 A1 | 4/2021 |
| EP | 3814895 A1 | 5/2021 |
| EP | 3857375 A1 | 8/2021 |
| EP | 4064052 A1 | 9/2022 |
| JP | 2002-287974 A | 10/2002 |
| JP | 2006-107599 A | 4/2006 |
| JP | 2007-080161 A | 3/2007 |
| JP | 2007-538323 A | 12/2007 |
| JP | 2010-026562 A | 2/2010 |
| JP | 2011-065243 A | 3/2011 |
| JP | 2011-233146 A | 11/2011 |
| JP | 2011-257847 A | 12/2011 |
| JP | 2012-078893 A | 4/2012 |
| JP | 2012-104150 A | 5/2012 |
| JP | 2013-156996 A | 8/2013 |
| JP | 2014-525624 A | 9/2014 |
| JP | 2016-507100 A | 3/2016 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| JP | 7197612 B2 | 12/2022 |
| JP | 7210713 B2 | 1/2023 |
| KR | 10-357850 B1 | 10/2002 |
| KR | 10-2021-0019533 A | 2/2021 |
| KR | 10-2541295 B1 | 6/2023 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2015/149017 A1 | 10/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/005829 A1 | 1/2018 |
| WO | WO 2018/039514 A1 | 1/2018 |
| WO | WO 2018/098443 A1 | 5/2018 |
| WO | WO 2018/098445 A1 | 5/2018 |
| WO | WO 2020/005764 A1 | 1/2020 |
| WO | WO 2020/006081 A1 | 1/2020 |
| WO | WO 2020/069104 A1 | 4/2020 |
| WO | WO 2020/123439 A1 | 6/2020 |
| WO | WO 2020/264431 A1 | 12/2020 |
| WO | WO 2021/108435 A1 | 6/2021 |
| WO | WO 2023/107649 A1 | 6/2023 |

(56) References Cited

OTHER PUBLICATIONS

Anonymous: "Amazon Simple Workflow Service Developer Guide API Version Jan. 25, 2012," Jun. 11, 2016 (Jun. 11, 2016), XP055946928, Retrieved from the Internet: URL:https://web.archive.org/web/20160111075522if_/http://docs.aws.amazon.com/amazonswf/latest/developerguide/swf-dg.pdf [retrieved on Jul. 28, 2022] in 197 pages.

Anonymous: "AWS Flow Framework for Java," Apr. 7, 2016 (Apr. 7, 2016), XP055946535, Retrieved from the Internet: URL:https://web.archive.org/web/20160407214715if_/http://docs.aws.amazon.com/amazonswf/latest/awsflowguide/swf-aflow.pdf, [retrieved Jul. 27, 2022] in 139 pages.

European Examination Report, re EP Application No. 17743108.7, dated Oct. 12, 2022.

First Chinese Office Action in Chinese Application No. 201780045148.9, dated Sep. 29, 2022.

Office Action in Japanese Application No. 2020-572443 dated Sep. 29, 2022.

Office Action in European Application No. 19736909.3 dated Oct. 12, 2022.

Anonymous: "Docker run reference", Dec. 7, 2015, XP055350246, Retrieved from the Internet: URL:https://web.archive.org/web/20151207111702/https://docs.docker.com/engine/reference/run/ [retrieved on Feb. 28, 2017].

Adapter Pattern, Wikipedia, https://en.wikipedia.org/w/index.php?title=Adapter_pattern&oldid=654971255, [retrieved May 26, 2016], 6 pages.

Amazon, "AWS Lambda: Developer Guide", Jun. 26, 2016 Retrieved from the Internet, URL:http://docs.aws.amazon.com/lambda/latest/dg/lambda-dg.pdf, [retrieved on Aug. 30, 2017], 314 pages.

Amazon, "AWS Lambda: Developer Guide", Apr. 30, 2016 Retrieved from the Internet, URL: https://web.archive.org/web/20160430050158/http://docs.aws.amazon.com:80/lambda/latest/dg/lambda-dg.pdf, 346 pages.

Amazon, "AWS Lambda: Developer Guide", Retrieved from the Internet, 2019, URL : http://docs.aws.amazon.com/lambda/ latest/ dg/lambda-dg.pdf, 521 pages.

Balazinska et al., Moirae: History-Enhanced Monitoring, Published: Jan. 2007, 12 pages.

Bebenita et al., "Trace-Based Compilation in Execution Environments without Interpreters," ACM, Copyright 2010, 10 pages.

Ben-Yehuda et al., "Deconstructing Amazon EC2 Spot Instance Pricing", ACM Transactions on Economics and Computation 1.3, Sep. 2013, 15 pages.

Bhadani et al., Performance evaluation of web servers using central load balancing policy over virtual machines on cloud, Jan. 2010, 4 pages.

Bryan Liston, "Ad Hoc Big Data Processing Made Simple with Serverless Map Reduce", Nov. 4, 2016, Amazon Web Services <https ://aws. amazon .com/bl ogs/compute/ad-hoc-big-data-processi ng-made-si mple-with-serverless-mapred uce >.

CodeChef Admin discussion web page, retrieved from https://discuss.codechef.com/t/what-are-the-memory-limit-and-stack-size-on-codechef/14159, retrieved on Sep. 10, 2019.

CodeChef IDE web page, Code, Compile & Run, retrieved from https://www.codechef.com/ide, retrieved on Sep. 9, 2019.

Czajkowski, G., and L. Daynes, Multitasking Without Compromise: A Virtual Machine Evolution 47(4a):60-73, ACM SIGPLAN Notices—Supplemental Issue, Apr. 2012.

Das et al., Adaptive Stream Processing using Dynamic Batch Sizing, Nov. 2014, 13 pages.

Deis, Container, Jun. 2014, 1 page.

Dean et al, "MapReduce: Simplified Data Processing on Large Clusters", ACM, 2008, pp. 107-113.

Dombrowski, M., et al., Dynamic Monitor Allocation in the Java Virtual Machine, JTRES '13, Oct. 9-11, 2013, pp. 30-37.

Dornemann et al., "On-Demand Resource Provisioning for BPEL Workflows Using Amazon's Elastic Compute Cloud", 9th IEEE/ACM International Symposium on Cluster Computing and the Grid, 2009, pp. 140-147.

Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.

Ekanayake et al, "Twister: A Runtime for Iterative MapReduce", ACM, 2010, pp. 810-818.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

Fan et al., Online Optimization of VM Deployment in IaaS Cloud, Dec. 17-Dec. 19, 2012, 6 pages.

Ha et al., A Concurrent Trace-based Just-In-Time Compiler for Single-threaded JavaScript, utexas.edu, Jun. 2009.

Hammoud et al, "Locality-Aware Reduce Task Scheduling for MapReduce", IEEE, 2011, pp. 570-576.

Han et al., Lightweight Resource Scaling for Cloud Applications, May 13-May 16, 2012, 8 pages.

Hoffman, Auto scaling your website with Amazon Web Services (AWS)—Part 2, Cardinalpath, Sep. 2015, 15 pages.

http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.

https://www.codechef.com code error help page from Jan. 2014, retrieved from https://www.codechef.com/JAN14/status/ERROR,va123, 2014.

http://www.codechef.com/ide web page from date Apr. 5, 2015, retrieved using the WayBackMachine, from https://web.archive.org/web/20150405045518/http://www.codechef.com/ide, 2015.

Huang, Zhe, Danny HK Tsang, and James She. "A virtual machine consolidation framework for mapreduce enabled computing clouds." 2012 24th International Teletraffic Congress (ITC 24). IEEE, Sep. 4-Sep. 7, 2012.

Kamga et al., Extended scheduler for efficient frequency scaling in virtualized systems, Jul. 2012, 8 pages.

Kato, et al. "Web Service Conversion Architecture of the Web Application and Evaluation"; Research Report from Information Processing Society, Apr. 3, 2006 with Machine Translation.

Kazempour et al., AASH: an asymmetry-aware scheduler for hypervisors, Jul. 2010, 12 pages.

Kim et al, "MRBench: A Benchmark for Map-Reduce Framework", IEEE, 2008, pp. 11-18.

Kraft et al., 10 performance prediction in consolidated virtualized environments, Mar. 2011, 12 pages.

Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.

Lagar-Cavilla et al., "SnowFlock: Virtual Machine Cloning as a First-Class Cloud Primitive", ACM Transactions on Computer Systems, vol. 29, No. 1, Article 2, Publication date: Feb. 2011, in 45 pages.

Lin, "MR-Apriori: Association Rules Algorithm Based on MapReduce", IEEE, 2014, pp. 141-144.

Meng et al., Efficient resource provisioning in compute clouds via VM multiplexing, Jun. 2010, 10 pages.

Merkel, "Docker: Lightweight Linux Containers for Consistent Development and Deployment", Linux Journal, vol. 2014 Issue 239, Mar. 2014, XP055171140, 16 pages.

Monteil, Coupling profile and historical methods to predict execution time of parallel applications. Parallel and Cloud Computing, Jul. 2013, <hal-01228236, pp. 81-89.

Nakajima, J., et al., Optimizing Virtual Machines Using Hybrid Virtualization, SAC '11, Mar. 21-25, 2011, TaiChung, Taiwan, pp. 573-578.

(56) References Cited

OTHER PUBLICATIONS

Qian, H., and D. Medhi, et al., Estimating Optimal Cost of Allocating Virtualized Resources With Dynamic Demand, ITC 2011, Sep. 2011, pp. 320-321.
Ryden et al., "Nebula: Distributed Edge Cloud for Data-Intensive Computing", IEEE, 2014, pp. 491-492.
Sakamoto, et al. "Platform for Web Services using Proxy Server"; Research Report from Information Processing Society, Mar. 22, 2002, vol. 2002, No. 31.
Search Query Report from IP.com, performed Dec. 2, 2020.
Search Query Report from IP.com, performed May 27, 2021.
Shim (computing), Wikipedia, https://en.wikipedia.org/w/index.php?title+Shim_(computing)&oldid+654971528, [retrieved on May 26, 2016], 2 pages.
Stack Overflow, Creating a database connection pool, Nov. 10, 2009, 4 pages.
Tan et al., Provisioning for large scale cloud computing services, Jun. 2012, 2 pages.
Tange, "GNU Parallel: The Command-Line Power Tool", vol. 36, No. 1, Jan. 1, 1942, pp. 42-47.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, Dec. 16-Dec. 19, 2014. Retrieved on Feb. 14, 2019, Retrieved from the internet: URL<https://ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en.wikipedia.org/wiki/Application_programming_interface.
Wikipedia List_of_HTTP status_codes web page, retrieved from https://en.wikipedia.org/wiki/List_of_HTTP status_codes, retrieved on Sep. 10, 2019.
Wikipedia Recursion web page from date Mar. 26, 2015, retrieved using the WayBackMachine, from https://web.archive.org/web/20150326230100/https://en.wikipedia.org/wiki/Recursion_(computer_science), 2015.
Wikipedia subroutine web page, retrieved from https://en.wikipedia.org/wiki/Subroutine, retrieved on Sep. 10, 2019.
Wood, Timothy, et al. "Cloud Net: dynamic pooling of cloud resources by live WAN migration of virtual machines." ACM Sigplan Notices 46.7 (2011): 121-132. (Year: 2011).
Wu et al., HC-Midware: A Middleware to Enable High Performance Communication SystemSimulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yang, The Application of MapReduce in the Cloud Computing:, IEEE, 2011, pp. 154-156.
Yue et al., AC 2012-4107: Using Amazon EC2 in Computer and Network Security Lab Exercises: Design, Results, and Analysis, 2012, American Society for Engineering Education, Jun. 10, 2012.
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
Office Action in Chinese Application No. 202110268031.5, dated Sep. 3, 2021.
Office Action in Canadian Application No. 2,962,633 dated May 21, 2020.
Office Action in Canadian Application No. 2,962,633 dated Jun. 18, 2021.
Office Action in European Application No. 19199402.9 dated Mar. 23, 2021.
Office Action in European Application No. 19199402.9 dated Dec. 3, 2021 in 4 pages.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
Extended Search Report in European Application No. 19199402.9 dated Mar. 6, 2020.
Office Action in Japanese Application No. 2017-516160 dated Jan. 15, 2018.
Notice of Allowance in Japanese Application No. 2017-516160 dated May 8, 2018.
Office Action in Canadian Application No. 2,962,631 dated May 19, 2020.
Office Action in Canadian Application No. 2,962,631 dated May 31, 2021.
Office Action in Indian Application No. 201717013356 dated Jan. 22, 2021.
Office Action in Japanese Application No. 2017-516168 dated Mar. 26, 2018.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
Office Action in Indian Application No. 201717019903 dated May 18, 2020.
International Search Report and Written Opinion in PCT/US2015/064071dated Mar. 16, 2016.
International Preliminary Report on Patentability in PCT/US2015/064071 dated Jun. 6, 2017.
Office Action in Australian Application No. 2016215438 dated Feb. 26, 2018.
Notice of Allowance in Australian Application No. 2016215438 dated Nov. 19, 2018.
Office Action in Canadian Application No. 2,975,522 dated Jun. 5, 2018.
Notice of Allowance in Canadian Application No. 2,975,522 dated Mar. 13, 2020.
Office Action in Indian Application No. 201717027369 dated May 21, 2020.
International Search Report and Written Opinion in PCT/US2016/016211 dated Apr. 13, 2016.
International Preliminary Report on Patentability in PCT/US2016/016211 dated Aug. 17, 2017.
Office Action in Chinese Application No. 201680020768.2 dated May 14, 2021 in 23 pages.
Office Action in Chinese Application No. 201680020768.2 dated Sep. 24, 2021 in 20 pages.
First Examination Report for Indian Application No. 201717034806 dated Jun. 25, 2020.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
Office Action in Chinese Application No. 2016800562398 dated Jun. 18, 2021.
International Search Report and Written Opinion in PCT/US2016/054774 dated Dec. 16, 2016.

(56) References Cited

OTHER PUBLICATIONS

Office Action in European Application No. 16781265.0 dated Jul. 13, 2020.
Office Action in Indian Application No. 201817013748 dated Nov. 20, 2020.
International Preliminary Report on Patentability in PCT/US2016/054774 dated Apr. 3, 2018.
Office Action in Chinese Application No. 201680072794X dated Jun. 22, 2021.
Office Action in European Application No. 16823419.3 dated Mar. 12, 2021.
International Search Report and Written Opinion in PCT/US2016/066997 dated Mar. 20, 2017.
International Preliminary Report on Patentability in PCT/US2016/066997 dated Jun. 26, 2018.
Office Action in Chinese Application No. 201780022789.2 dated Apr. 28, 2021.
Office Action in European Application No. 17776325.7 dated Apr. 12, 2021.
International Search Report and Written Opinion in PCT/US/2017/023564 dated Jun. 6, 2017.
International Preliminary Report on Patentability in PCT/US/2017/023564 dated Oct. 2, 2018.
Office Action in Chinese Application No. 2017800451968 dated May 26, 2021.
Office Action in Chinese Application No. 2017800451968 dated Dec. 3, 2021 in 20 pages.
Office Action in European Application No. 17740533.9 dated May 4, 2021.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
Office Action in European Application No. 17743108.7 dated Jan. 14, 2020.
Office Action in European Application No. 17743108.7 dated Dec. 22, 2020.
International Search Report and Written Opinion dated Oct. 15, 2019 for International Application No. PCT/US2019/039246 in 16 pages.
International Preliminary Report on Patentability dated Dec. 29, 2020 for International Application No. PCT/US2019/039246 in 8 pages.
Office Action in Japanese Application No. 2020-572441 dated Dec. 22, 2021 in 8 pages.
International Search Report for Application No. PCT/US2019/038520 dated Aug. 14, 2019.
International Preliminary Report on Patentability for Application No. PCT/US2019/038520 dated Dec. 29, 2020.
International Preliminary Report on Patentability and Written Opinion in PCT/US2019/053123 dated Mar. 23, 2021.
International Search Report and Written Opinion in PCT/US2019/053123 dated Jan. 7, 2020.
International Search Report for Application No. PCT/US2019/065365 dated Mar. 19, 2020.
International Preliminary Report on Patentability for Application No. PCT/US2019/065365 dated Jun. 8, 2021.
International Search Report for Application No. PCT/US2020/039996 dated Oct. 8, 2020.
International Preliminary Report on Patentability for Application No. PCT/US2020/039996 dated Jan. 6, 2022.
International Search Report for Application No. PCT/US2020/062060 dated Mar. 5, 2021.

Office Action in Japanese Application No. 2020-572443 dated Feb. 28, 2022.
Abebe et al., "EC-Store: Bridging the Gap Between Storage and Latency in Distribute Erasure Coded Systems", IEEE 38th International Conference on Distributed Computing Systems, 2018, pp. 255-266.
Huang et al., "Erasure Coding in Windows Azure Storege", USENIX, 2012 in 12 pages.
Rashmi et al., "EC-Cache: Load-Balance, Low-Latency Cluster Caching with Online Erasure Coding", USENIX, 2016, pp. 401-417.
Communication Pursuant to Article 94(3) EPC in European Application No. 19199402.9 dated Apr. 19, 2022 in 5 pages.
Office Action in European Application No. 16823419.3 dated May 20, 2022 in 6 pages.
Office Action in European Application No. 19740451.0 dated Jun. 13, 2022 in 4 pages.
Office Action in Korean Application No. 10-2021-7000975 dated Mar. 31, 2022 in 12 pages.
Office Action in Japanese Application No. 2021-517335 dated May 16, 2022.
International Preliminary Report on Patentability for Application No. PCT/US2020/062060 dated Jun. 9, 2022 in 9 pages.
Decision to refuse a European Patent Application in European Patent Application No. 16716797.2 dated Dec. 20, 2021 in 20 pages.
Anonymous: "Amazon Cognito Developer Guide," Jun. 24, 2001, XP093030075, retrieved from the internet: URL:https://web.archive.org/web/20210624153941if_/https://docs.aws.amazon.com/cognito/latest/developerguide/cognito-dg.pdf [retrieved on Mar. 9, 2023] the whole document.
Anonymous: "AWS Lambda Developer Guide," Jul. 1, 2021, XP093024770, retrieved from the internet: URL:https://web.archieve.org/web/20210701100128if_/https://docs.aws.amazon.com/lambda/latest/dg/lambda-dg.pdf [retrieved on Feb. 17, 2023] the whole document.
Anonymous: "AWS Lambda Developer Guide," Jul. 1, 2021, XP093024770, retrieved from the internet: URL:https://web.archive.org/web/20210701100128if_/https://docs.aws.amazon.com/lambda/latest/dg/lambda-dg.pdf [retrieved on Feb. 17, 2023] the whole document.
Anonymous: SaaS Tenant Isolution Strategies Isolating Resources in a Multi-Tenant Environment,: Aug. 1, 2020, XP093030095, retrieved from the internet: URL:https://dl.awsstatic.com/whitepapers/saas-tenant-isolation-strategies.pdf [retrieved on Mar. 9, 2023] the whole document.
Anonymous: "Security Overview of AWS Lambda," Aug. 11, 2021, XP093030100, retrieved from the internet: URL:https://web.archive.org/web/20210811044132if_/https://docs.aws.amazon.com/whitepapers/latest/security-overview-aws-lambda/security-overview-aws-lambda.pdf [retrieved Mar. 9, 2023] the whole document.
Sharma A. et al., "Building a Multi-Tenant SaaS Solution Using AWS Serverless Services," Aug. 26, 2021, XP093030094, retrieved from the internet: URL:https://aws.amazon.com/blogs/apn/building-a-multi-tenant-saas-solution-using-aws-serverless-services/ [retrieved on Mar. 9, 2023] the whole document.
International Search Report and Written Opinion, re PCT Application No. PCT/US2022/052315, dated Mar. 20, 2023.
Anonymous: "alias (command)—Wikipedia," Jun. 28, 2016, pp. 106, XP093089956, Retrieved from the Internet: URL:https://en.wikipedia.org/w/index.php?title=Alias_(command)&oldid=727315645 [retrieved on Oct. 9, 2023.
Al-Ali, et al., Making Serverless Computing More Serverless. 2018 IEEE 11th International Conference on Cloud Computing (CLOUD). Https://ieeexplore.ieee.org/stamp/stamp.jsp?tp=&amumber=8457832 (Year: 2018).
Gimenez-Alventosa, et al., tAsCAAs: a Multi-Tenant Serverless Task Scheduler and Load Balancer as a Service. IEEE Access, vol. 9. https://ieeexplore.ieee.org/stamp/stamp.jsp?tp=&amumber=9528423 (Year: 2021).
IBM, what is Serverless computing, https://www.IBM.com/topics/serverless#:-:test=Serverless%20is%20a%20cloud%20computing,managing%20servers%20or%20backend%20infrastructure, pp. 1-11 (Year: 2023).

(56) References Cited

OTHER PUBLICATIONS

Khedekar, et al., Multi-Tenant Big Data Analytics on AWS Cloud Platform. 2020 10th Annual Computing and Communication Workshop and Conference (CCWC). Https://ieeexplore.ieee.org/stamp/staum.jsp?tp=&amumber=9031133 (Year: 2020).

Neenan, Sarah Compare Serverless tools and services in the Public cloud, https://www.techtarget.com/searchcloudcomputing/feature/Compare-serverless-tools-and-services-in-the-public-cloud, TechTarget, pp. 1-4 (Year: 2023).

Wikipedia: Serverless computing, https://en.wikipedia.org/wiki/Serverless_computing, p. 107 (Year: 2023).

Zheng, et al., "A Multi-Tenant Framework for Cloud Container Services," 2021 IEEE 41st International Conference on Distributed Computer Systems (ICDCS). Https://ieeexplore.ieee.org/stamp/stamp.jsp?tp=&amumber=9546534 (Year: 2021).

\* cited by examiner

CONTROLLING INGESTION OF STREAMING DATA TO SERVERLESS FUNCTION EXECUTIONS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources. 7

One example use of data centers is to process or analyze streaming data, organized as a collection of data items (in some contexts referred to as "messages") in a data stream. In this context, a data "stream" is a set of data that is periodically or continuously updated, rather than being available as a complete collection. In some instances, data within a data stream may be transient, and thus available only for a limited time. For example, each item within a data stream may "expire" and thus become unavailable after a threshold period, such as 24 hours from a time point at which the item entered the stream. In some cases, the volume of data on a data stream varies significantly over time. For example, a data stream may be reflective of user activity, and thus the volume of data may vary considerably based on active hours of relevant users. Due to these characteristics of data streams, such as the potential for varying volumes and limited-time access to data items, it is often desirable for analysis and processing of data streams to occur with timing commensurate to publishing of data to the data stream. This enables such analysis and processing to "keep up" with data published to the stream, and avoids backlogs that may result in undesirable delay or in some cases may result in data being lost prior to processing.

DETAILED DESCRIPTION

Figure 1:
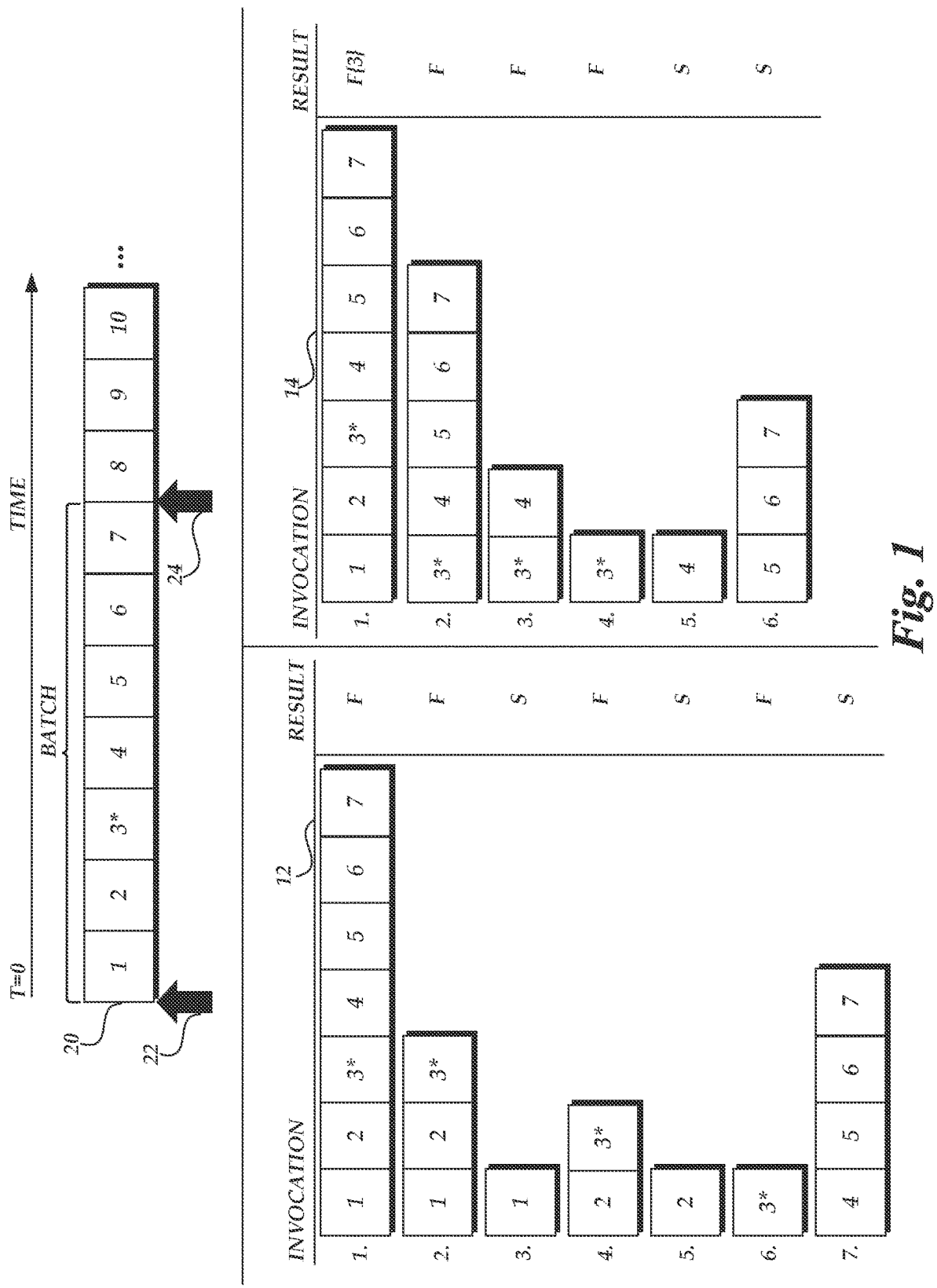
FIG. 1 is an illustrative visualization of a data stream and example submissions of data items within the data stream to serverless function executions under different scenarios.

Generally described, aspects of the present disclosure relate to controlling ingestion of streaming data to serverless function executions. Due to the highly efficient and flexible nature of serverless computing, serverless compute systems are well suited to processing data from streaming data sources. For example, because serverless computing can efficiently and quickly scale computing processes, processing on a serverless computing environment can be scaled to match a volume of data in a data stream. This in turn enables data within the stream to be quickly processed according to requirements for that processing, including real-time processing requirements. One issue with use of serverless functions (sets of code executed on a serverless compute system) to process data streams is the general need for an intermediary between a data stream and serverless function executions. Because a data stream represents a readable set of data while a serverless function must generally be invoked, there is often a need for intermediary logic to read data from a data stream and invoke execution of a corresponding function. However, a naïve intermediary between a data stream and a serverless computing system can lead to inefficiencies. For example, each execution of a serverless function may result in some overhead, associated with, e.g., transmitting a call to execute the function, handling the call, beginning execution, etc. Accordingly, a basic system that iteratively retrieves and submits each individual data item to a serverless compute system may result in inefficiencies. One mechanism for avoiding this inefficiency is to "batch" together multiple data items from a stream, submitting each batch for collective processing via a serverless function. However, this in turn can lead to problems, particularly in cases where individual data items are not correctly processed by a serverless function execution. For example, if one data item within a batch of five is malformed, execution of a serverless function may process most of the data items before failing on the malformed item, resulting in failure of the execution with respect to an entire batch of data items. Should basic retry logic be implemented at the intermediary system, this pattern may be repeated multiple times, resulting in inefficient use of computing resources (given, e.g., that at least some data items of the batch are successfully processed on each call and therefore effort is duplicated). While more complex intermediary logic may be possible to address these cases, the wide variety of possible cases is difficult to support via pre-defined configuration of the intermediary system. Moreover, the logic required to address all possible cases can result in significant computational expenditure at the intermediary system, should that logic be implemented at the intermediary system.

Embodiments of the present disclosure address these problems by facilitating control of an intermediary system, acting between a data stream and serverless function executions, from within the serverless function executions. Serverless functions provide numerous benefits, including rapid extensibility for execution of user-defined code. These benefits in turn provide for an efficient location at which to implement logic to control an intermediary system. As disclosed herein, an intermediary system (which may in some embodiments be referred to herein as a "poller device" or the like, as discussed in more detail below) may enable a serverless function execution, when interacting with the intermediary system, to control various aspects of operation of the intermediary system in retrieving data from a data stream, submitting that data to a subsequent serverless function execution, or both. This can enable the intermediary system to operate based logic handling a wide variety of use cases, without requiring that such logic actually be conducted on the intermediary system. Rather, such logic may be performed within a serverless function execution, removing need for pre-configuration of the intermediary system or the implementation of complex logic on the intermediary system.

For example, in the case where a batch of data items contains one or more items that cause processing failures, a serverless function execution in accordance with embodiments of the present disclosure may notify an intermediary device of how to submit additional data items for processing to a subsequent serverless function execution. Illustratively, if an error occurs when processing the third data item in a batch of five at a serverless function execution, the execution may notify an intermediary system to resubmit the batch beginning from the third data item. As a result, successful processing of the first two data items need not be repeated. Similarly, if the function execution determines that the third data item is malformed and cannot be processed, the execution may notify an intermediary system to resubmit the batch from the fourth data item, enabling processing to resume while avoiding the malformed data item. In instances where items within a stream required ordered processing, a serverless function execution may return a single pointer indicating a location of a data item in the stream from which to restart submission. In instances where unordered processing is acceptable, the function may return instructions to an intermediary device identifying a set of locations within the stream, such as a set of locations successfully processed, a set of locations unsuccessfully processed that should be resubmitted, a set of locations unsuccessfully processed that should not be resubmitted, a set of locations not processed, or a combination thereof.

In addition to selecting data items for submission or resubmission, an intermediary system may additionally or alternatively enable a serverless function execution to control other aspects of serverless function invocation, such as "target" function (e.g., the particular serverless function to which batches of data items should be submitted), a batch size (e.g., a number of items submitted to each execution), a batch cadence (e.g., a timing between function invocations), or the like. Further, an intermediary system may additionally or alternatively enable a serverless function execution to control other aspects of operation of the intermediary system, such as how the intermediary system reads data items from a data stream, including for example an identifier of the data stream, which data items are read from the stream (e.g., by dictation of filtering criteria), a batch size for reading from the stream (e.g., a number of data items read per read request), a cadence for read requests (e.g., how often reads occur), etc. In some embodiments, an intermediary system may provide functionality in addition to reading from a data stream and invoking a serverless function.

For example, an intermediary system may provide for monitoring state of the system, such as by submitting completion notifications to a destination on successful processing of a data item, batch of data items, etc. The intermediary system can additionally or alternatively enable a serverless function to control these aspects of operation, such as by modifying a destination for monitoring information. For example, on successfully processing a batch, a function execution may return a location (e.g., as a uniform resource locator or the like) to which to submit a completion notification, and the intermediary system may transmit the completion notification to the location. In this manner, a wide variety of logic can be implemented at serverless function executions to control operation of the intermediary system, and thereby control ingestion of streaming data to serverless function executions.

As described herein, a serverless compute system (which may also be referred to as a "serverless code execution system" or an "on-demand code execution system") enables rapid execution of code, which may be supplied by users of the serverless compute system. On submitting code, the serverless compute system can then enable the user to submit "calls" or "invokes" to execute the code, at which point the serverless compute system will generate an execution environment for the code and execute the code within the environment to provide the desired functionality. The environment can then be destroyed shortly after providing the desired functionality, such that a user is responsible only for resources used during execution. These execution times are often very short, making serverless computing highly efficient, particularly for tasks with varying demand levels. Because the serverless compute system (and not the end user) generally handles management of execution environments, these systems are generally referred to as "serverless," despite the general use of servers to support such environments.

The serverless compute system, as described in detail herein, may provide a network-accessible service enabling users to submit or designate computer-executable code to be executed by virtual machine instances (or other execution environments, such as containers providing operating-system level virtualization) on the serverless compute system. Each set of code on the serverless compute system may define a "task" or "function" and implement specific functionality corresponding to that function when executed on a virtual machine instance of the serverless compute system. Individual implementations of the function on the serverless compute system may be referred to as an "execution" of the function (or a "function execution"). The serverless compute system can further enable users to trigger execution of a function based on a variety of potential events, such as detecting new data at a network-based storage system, transmission of an application programming interface ("API") call to the serverless compute system, or transmission of a specially formatted hypertext transport protocol ("HTTP") packet to the serverless compute system. Thus, users may utilize the serverless compute system to execute any specified executable code "on-demand," without requiring configuration or maintenance of the underlying hardware or infrastructure on which the code is executed. Further, the serverless compute system may be configured to execute functions in a rapid manner (e.g., in under 100 milliseconds [ms]), thus enabling execution of functions in "real-time" (e.g., with little or no perceptible delay to an end user).

Because the serverless compute system can provide the ability to execute a function on-demand, without configuration of an underlying device on which to execute the code, the on serverless compute system can provide an excellent platform on which to implement processing or analytics with respect to data streams. For example, the serverless compute system can enable a user to implement streaming analytics effectively without regard for the volume of data published to an input data stream, as scaling of compute resources to process the data can be handled by the serverless compute system, rather than being preconfigured by a user. One aspect that enables such behavior is an ability for serverless function executions to be parallelized. For example, as the volume of data items in a data stream grows, the stream may be partitioned into sub-streams, sometimes referred to as "shards." Each shard may contain a portion of data from the data stream, which portion may be processed or analyzed independently or semi-independently from other portions. In accordance with embodiments of the present disclosure, each shard may be associated with a particular intermediary device, which functions to read data items from the shard and invoke a serverless function execution to process those data items. Notably, the intermediary devices from each shard may not be required to control how function execution occurs; rather, they may submit requests to execute a serverless function to the serverless compute system, which may locate an appropriate environment and execution code of the function in the environment. Thus, if two intermediary devices (e.g., of two different shards) are operating concurrently but not submitting overlapping execution requests, requests of both devices may be fulfilled by execution of code in the same environment. If two such devices are submitting overlapping execution requests, execution of the function may occur independently in two different environments (by virtue of operation of the serverless code execution system). This ability to simply and efficiently parallelize execution enables processing of data streams to scale appropriately to the volume of data on the stream.

Embodiments of the present disclosure maintain these benefits, by enabling individual function executions to control operation of an intermediary device providing data items to subsequent function executions. Specifically, embodiments of the present disclosure may be implemented without requiring centralized control over a data stream, and without requiring a single persistent function execution to control such ingestion. Accordingly, should a data stream grow in size and "split" into multiple shards, an intermediary device for each shard may submit data items from the shard to a respective function execution, which function execution can in turn control how the device for that shard submits data items to subsequent executions. This operation thus maintains parallelization of operation. In addition, because serverless function executions can control operation of an intermediary device with respect to subsequent invocations, there is no requirement that a particular serverless function execution persist to control the intermediary device. Rather, each execution can evaluate the data items submitted and implement logic to control subsequent operation of the intermediary device. The device can then alter its operation and submit additional calls to execution the function, which may be unrelated to prior executions (e.g., the code of the function may execute in a different environment, may lack state information of a prior execution, etc.). Accordingly, there is no requirement for continuity between function executions. Embodiments of the present disclosure thus maintain existing benefits regarding use of serverless function executions to conduct streaming analytics, while providing for greater control of intermediary devices.

To better illustrative ingestion control functionalities that may be implemented by interactions between a serverless function execution and an intermediary device as disclosed herein, FIG. 1 shows illustrative sets of data items within a data stream 20, and example submissions of such data items to serverless function executions under different scenarios. In particular, table 12 depicts example submissions of data items to a serverless function under pre-configured operation of an intermediary device, while table 14 depicts example submission of data items to a serverless function where operation of the intermediary device is controlled at least in part by execution of logic within an execution of the serverless function. As shown in FIG. 1, the submissions controlled at least partly by execution of logic within a serverless function execution, as shown in table 14, result in significant increases in computational efficiency relative to the pre-configured operation shown in table 12.

In FIG. 1, it is assumed for illustrative purposes that a set of data items, labeled item 1 through item 10, exist in a data stream 20. It is further assumed that the data items are ordered in time, with data item 1 being submitted prior to data item 2, etc. For example, data items may be pushed to the stream 20 over time by operation of a computing device on a network. Still further, it is assumed that an intermediary device (e.g., a poller device as discussed in more detail below) operates to read data items off of the stream 20 and submit batches of such data items to a serverless function for processing, by invoking an execution of the serverless function for each batch of data items. In FIG. 1, the batch size is illustratively set to 7, and thus (as shown in FIG. 1) data items 1 through 7 exist within an initial batch. It should be understood that this batch size is provided for illustration only, and may vary.

To facilitate operation, the intermediary device illustratively maintains two pointers, each corresponding to a location within the data stream. The first pointer, pointer 22, indicates a location of a last item within the data stream acknowledged as processed by the serverless function. Because the illustration of FIG. 1 begins at a time t=0 prior to processing of any data items shown within the stream 20, the pointer 22 is set to the beginning of the stream, prior to data item 1. Thus, the pointer 22 indicates that none of the data items shown in FIG. 1 have yet been processed. It should be understood that because a data stream may be continuous, t=0 can represent any established starting time, and may not necessarily correspond to a beginning of the data stream 20. Thus, the stream 20 should be understood to possibly contain data items prior to data item 1.

In addition, the intermediary device maintains a second pointer, read pointer 24, which indicates a "read position," or a position of a last read data item from the data stream 20. In FIG. 1, the read pointer 24 is positioned subsequent to data item 7, indicating that items preceding the read pointer 24 have been read by the intermediary device. While the read pointer 24 in FIG. 1 is positioned at the end of the batch shown in FIG. 1, this may not be a requirement. That is, the read pointer 24 may be set subsequent to a current batch, with items subsequent to a current batch being, e.g., held in memory of the intermediary device for submission in a subsequent batch.

It is further assumed for illustration in FIG. 1 that one or more data items within the data stream result in processing errors. These errors may be related, e.g., to the content of the data item. In some instances, these errors may be persistent. For example, a data item may be malformed such that it is unprocessable by a serverless function. In other instances, an error may be transient. For example, processing of a data item may fail due to random or transient conditions, such that reprocessing of the data item may subsequently succeed. In FIG. 1, data item 3 is assumed to be malformed and therefore the cause of a persistent error. Data item 3 is thus marked in FIG. 1 with an asterisk.

As noted above, FIG. 1 depicts submissions of the batch of data items to a serverless function under different scenarios. In particular, table 12 depicts example submissions of data items to a serverless function under pre-configured operation of an intermediary device, while table 14 depicts example submission of data items to a serverless function where operation of the intermediary device is controlled at least in part by execution of logic within an execution of the serverless function. In the example of table 12, submissions are assumed to either succeed or fail as a whole. That is, submission of a batch to a serverless function execution may result in a "success" response or a "failure" response (designated in FIG. 1 by "S" or "F", respectively, in table 12). Further, in table 12, an intermediary device is assumed to have a "bisect batch on error" configuration, via which the failure of a given batch results in the device bisecting the batch into two parts, and resubmitting the first part to the serverless function for execution. (In FIG. 1, this bisection is assumed to be "lazy" with respect to a first part, and as such partial items are excluded from the first part and included in a second part.)

This bisection strategy may help to isolate malformed or error-prone data items under simple and widely applicable control logic. However, as can be seen in table 12, this strategy can result in significant duplicative processing. Specifically, in table 12, a first invocation of a serverless function includes all seven data items in a batch. The resulting function execution may iteratively process the data items, failing on data item 3. As a result, a failure response is returned. In response to the error, the intermediary device can bisect the batch, resulting in a batch of data items 1 through 3. A resulting second invocation of the serverless function includes data items 1 through 3. The resulting function execution may iteratively process the data items, again failing on data item 3. As a result, a failure response is returned. In response to the error, the intermediary device once again bisects the past batch (or batch portion), resulting in a new batch of only data item 1, which is passed in a subsequent invocation. As shown in FIG. 1, this invocation succeeds, indicating to the intermediary device that data item 1 has been successfully processed. Because invocation 3 succeeded, the intermediary device then submits an invocation (invocation 4) of the function, passing the second part of the previously bisected batch, data items 2 and 3. Invocation 4 fails, as it includes the malformed data item 3, and a failure response is obtained at the intermediary device. As a result, the intermediary device bisects the prior submission, resulting in a new batch of only data item 2, which is passed in a subsequent invocation (invocation 5). As shown in FIG. 1, this invocation succeeds, indicating to the intermediary device that data item 2 has been successfully processed. After successful processing of data item 2, the intermediary device then submits data item 3 independently, as that data item represents the $2^{nd}$ half of the bisection subsequent to invocation 4. Data item 3, in being malformed, fails. In the illustrative interactions of FIG. 1, failure of an individual data item can result in the intermediary device identifying the data item as malformed, and thus halting further invocations passing the data item. In other instances, the intermediary device may maintain a "retry limit" for individual data items, such that invocation 6 is repeated up to a threshold number of times. Subsequent to halting invocations with respect to data item 3, the intermediary device invokes the serverless function with respect to data items 4 through 7 (the second half of the bisection after invocation 1) as shown at invocation 7. This invocation succeeds, thus completing processing of the initial batch of data items 1 through 7.

As can be seen in table 12, the "bisect batch on error" strategy results in successful isolation of the malformed data item 3, and successful processing of the remaining data items in the initial batch. However, it also results in significant excess computation. For example, under conditions of iterative processing (where each data item is processed prior to a subsequent data item), data item 1 is processed a total of three times, in invocations 1, 2, and 3. Similarly, data item 2 is processed 4 times, in invocations 1, 2, 4, and 5. This results in a significant loss in efficiency relative to the techniques described herein, in which a function invocation may return information controlling subsequent operation of an intermediary device, such as which data items are resubmitted to a function for processing.

Table 14 depicts example submission of data items to a serverless function where operation of the intermediary device is controlled at least in part by execution of logic within an execution of the serverless function. Similarly to table 12, each line in table 14 reflects an individual invocation and a corresponding result. However, unlike table 12, the result of table 14 can indicate complete success ("S"), complete failure ("F"), or partial failure, with partial failure indicating a position within the data stream at which processing failed (in the form of "F{n}", where n represents the position) corresponding to a position of a first data item to be resubmitted in a subsequent invocation. Accordingly, the modified responses of table 14 relative to table 12 enable a serverless function invocation to instruct an intermediary device as to a first data item to be resubmitted, reducing duplicate processing relative to the interactions of table 12, as well as a reduction in the total number of invocations.

Specifically, the first invocation of table 14 matches that of table 12, passing the entire initial batch of data items 1 through 7 to a serverless function. As in table 12, this invocation results in at least a partial failure of processing due to the presence of data item 3. However, in contrast to table 12, where a response indicates only success or failure, the response of table 14 identifies data item 3 as the first failed data item, indicating that the batch is to be resubmitted beginning with data item 3. (Equivalently in this example, a response of S{2}, indicating success up to data item 2, may be returned.) Accordingly, at interaction 2, the intermediary device resubmits the batch beginning with data item 3. Because data item 3 is assumed to be malformed, this second invocation fails entirely (e.g., no data items were successfully processed). The interactions of table 14 may proceed similar to the interactions of table 12 in the case of total failure, bisecting the batch and resubmitting a first bisected portion. Accordingly, invocation 3 and 4 represent iterative bisections of the batch of invocation 2, each of which fails due to the presence of data item 3. At interaction 4, the failure of a batch containing only data item 3 results in the intermediary device identifying data item 3 as malformed, thus omitting the data item from subsequent invocations. (Similarly to as noted above with respect to table 12, interaction 4 may be repeated up to a retry limit, in some examples.) Accordingly, invocation 5 passes data item 4 for processing, as the second half of the bisection occurring after invocation 3, and invocation 6 passes data items 5-7 for processing as the second half of the bisection occurring after invocation 2. Both invocations 5 and 6 succeed, resulting in complete processing of the batch.

As can be seen when comparing table 12 and 14, the ability of a serverless function execution to indicate a specific failure point at invocation 1 substantially changes the interactions of the respective tables. Relative to table 12, table 14 contains fewer invocations, and does not result in duplicative processing with respect to data items. Accordingly, the interactions of table 14 can represent a significant improvement in computational efficiency relative to those of table 12.

It should be noted that additional logic implemented at a serverless function may further improve performance when processing a data stream. For example, the invocations of table 14 may be modified such that the response of a serverless function indicates that a data item is recognized as malformed and should not be resubmitted. Illustratively, a serverless function may return a map indicating a status of each data item within a submitted batch, such as a "success" status, a "failure-no retry" status, or a "failure-retry" status. An intermediary device may then retry those data items with the retry status, enabling it to quickly halt retrying of "failure-no retry" data items. In this scenario, table 14 may thus be modified to remove data item 3 from invocation 2, which may also result in obviating invocations 3 and 4. Accordingly, the number of invocations can be further reduced. Notably, these improvements can occur without requiring customized logic to be implemented at an intermediary device. Rather, instructions for subsequent operation of the intermediary device can be provided by a serverless function execution, such as in the response provided by that function in response to an invocation.

While FIG. 1 reflects how invocations may vary based on instructions with respect to the status of individual data items, a serverless function response may control other aspects of an intermediary device's operation. As noted above, these may include aspects related to reading data items from a data stream, such as changing an identifier of the data stream, changing which data items are read from the stream (e.g., by dictation of filtering criteria), changing batch size for reading from the stream (e.g., a number of data items read per read request), changing a cadence for read requests (e.g., how often reads occur), etc. These may further include changing other aspects of serverless function invocation, such as changing a "target" function (e.g., the particular serverless function to which batches of data items should be submitted), changing a batch size (e.g., a number of items submitted to each execution), changing a batch cadence (e.g., a timing between function invocations), etc. In some embodiments, an intermediary system may provide functionality in addition to reading from a data stream and invoking a serverless function. For example, an intermediary system may provide for monitoring state of the system, such as by submitting completion notifications to a destination on successful processing of a data item, batch of data items, etc. The intermediary system can additionally or alternatively enable a serverless function to control these aspects of operation, such as by modifying a destination for monitoring information. For example, on successfully processing a batch, a function execution may return a location (e.g., as a uniform resource locator or the like) to which to submit a completion notification, and the intermediary system may transmit the completion notification to the location. Logic for controlling these functions may be included within code of a serverless function, thus enabling highly customized control of an intermediary device via execution of serverless code.

While FIG. 1 is described as relating to a data stream, similar interactions may occur with respect to a shard representing a portion of a data stream. Moreover, while embodiments of the present disclosure may be described with reference to message streams, these embodiments may additionally or alternatively operate with respect to message queues or other collections of messages. Thus, where the present disclosure discusses interactions with a data stream, it should be understood that similar interactions may occur with respect to other message collections.

As will be appreciated by one of skill in the art in light of the present disclosure, the embodiments disclosed herein improves the ability of computing systems, such as serverless compute systems, to implement processing of data streams, such as in conducting streaming data analytics. More specifically, embodiments of the present disclosure enable efficient and highly customizable ingestion of data items into serverless function executions without requiring extensive logic performance on an intermediary device and without requiring a separate centralized device to provide such logic. Moreover, the presently disclosed embodiments address technical problems inherent within computing systems; specifically, the difficult of efficiently conducting analysis and processing of streaming data items in a manner that maintains efficiency and flexibility to account for changing volumes of data items as well as accounting for the wide variety of outcomes of such analysis and processing. These technical problems are addressed by the various technical solutions described herein, including the use of a response from a serverless function invocation to control subsequent serverless function invocations by an intermediary device. Thus, the present disclosure represents an improvement on existing data stream processing systems and computing systems in general.

Figure 2:
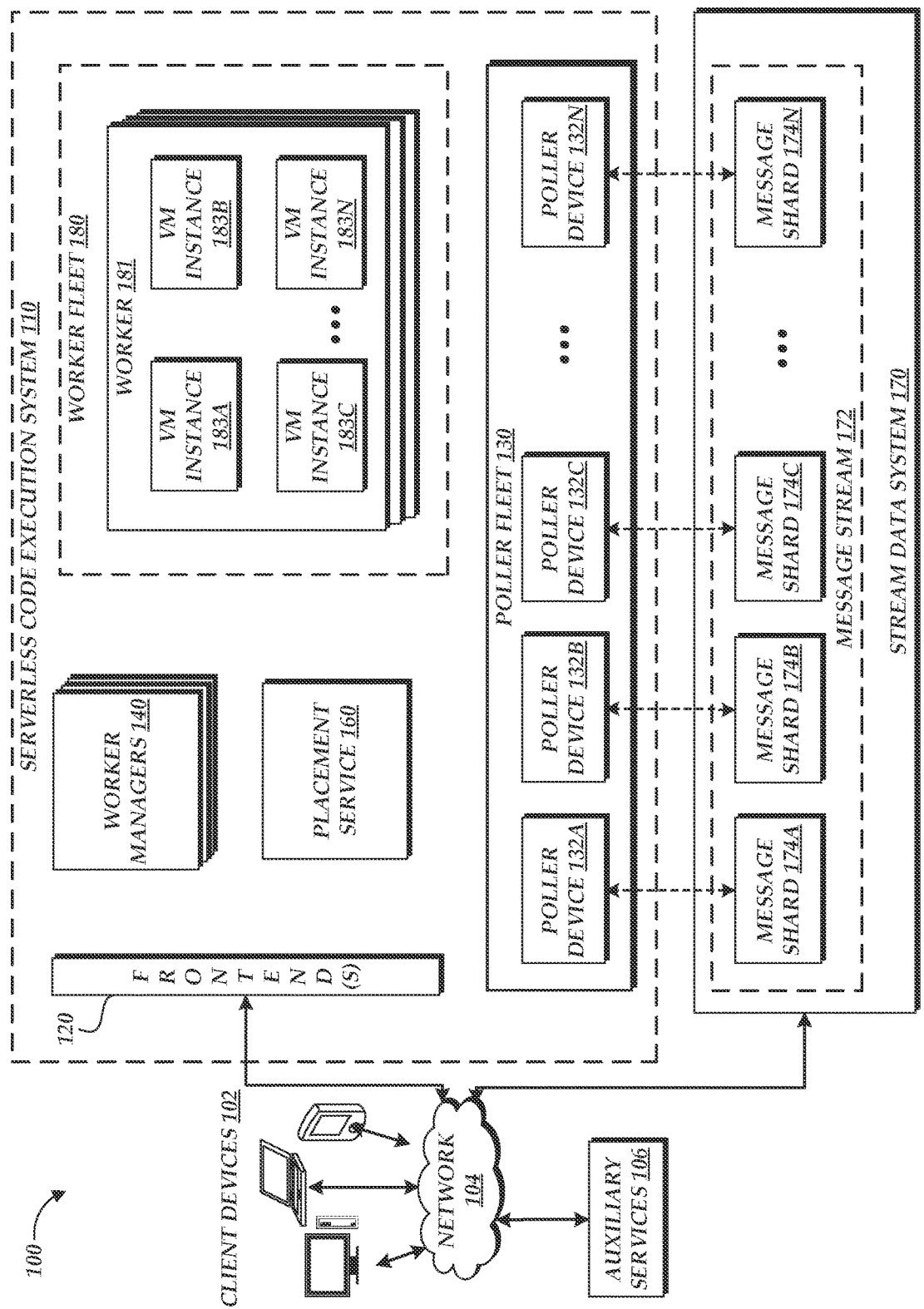
FIG. 2 is a block diagram depicting an illustrative environment in which processing of data items within a data stream can be conducted by invocation of serverless functions on a serverless compute system, with such functions controlling ingestion of data items from the data stream into executions of the functions.

FIG. 2 is a block diagram of an illustrative operating environment 100 for a serverless code execution system 110, in which a poller fleet 130 may provide for poller devices 132 that facilitate, on behalf of client devices 102, processing of data items published to a message stream 172 of a stream data system 170.

By way of illustration, various example client devices 102 are shown in communication with the serverless code execution system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The serverless code execution system 110 may provide the client devices 102 with one or more user interfaces, command-line interfaces (CLI), application programing interfaces (API), and/or other programmatic interfaces for generating and uploading user-executable source code (e.g., as part of a disk image), invoking the user-provided source code (e.g., submitting a request to execute the source code on the serverless code execution system 110), scheduling event-based code executions or timed code executions, tracking the user-provided source code, and/or viewing other logging or monitoring information related to their requests and/or source code. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the serverless code execution environment 110 to implement desired functionality on behalf of a user. Auxiliary services 106 can correspond to network-connected computing devices, such as servers, which generate data accessible to the serverless code execution environment 110 or otherwise communicate to the serverless code execution environment 110. For example, the auxiliary services 106 can include web services (e.g., associated with the user computing devices 102, with the serverless code execution system 110, or with third parties), databases, really simple syndication ("RSS") readers, social networking sites, or any other source of network-accessible service or data source. In some instances, auxiliary services 106 may be invoked by code execution on the serverless code execution system 110, such as by API calls to the auxiliary services 106. In some instances, auxiliary services 106 may be associated with the serverless code execution system 110, e.g., to provide billing or logging services to the serverless code execution system 110. In some instances, auxiliary services 106 actively transmit information, such as API calls or other task-triggering information, to the serverless code execution system 110. In other instances, auxiliary services 106 may be passive, such that data is made available for access by the serverless code execution system 110. For example, components of the serverless code execution system 110 may periodically poll such passive data sources, and trigger execution of code within the serverless code execution system 110 based on the data provided. While depicted in FIG. 2 as distinct from the user computing devices 102 and the serverless code execution system 110, in some embodiments, various auxiliary services 106 may be implemented by either the user computing devices 102 or the serverless code execution system 110.

The illustrative environment 100 further includes a stream data system 170. As discussed above, the stream data processing system can provides the ability for upstream devices to place data onto a message stream 172, such as by publishing "messages" onto the stream 172, which may be designated based on a specific "topic." While a single stream 172 is shown in FIG. 1, the system 170 may provide multiple streams on behalf of multiple parties. The system 170 can make messages within the stream 172 available to downstream devices, often in a "first-in-first-out" ("FIFO") or nearly FIFO order. In some instances, the stream data system 170 "pushes" messages to downstream devices. In other instances, downstream devices "pull" messages from the message stream 172 on request. Generally, the stream data system 170 is configured to provide resiliency, such that data successfully published to the stream is unlikely to be lost due to failures of devices of the stream data system 170. For example, the system 170 may duplicate messages placed onto the stream 172 onto multiple computing devices used to implement the stream (e.g., physical computing devices or virtual devices implemented on physical hosts). Moreover, the stream data system 170 can be configured to provide parallelization of the devices that maintain the message stream 172. For example, a user configuring a message stream may designate a partition key for the stream, used to divide the stream into sub-streams, each sub-stream handled by one or more parallelized devices. The sub-streams are shown in FIG. 1 as message shards 174A-N. Each message shard 174 can generally represent one or more computing devices configured to obtain and make available a subset of messages on the message stream, selected by the system 170 according to the partition key and a volume of messages on the stream 170 (e.g., such that additional shards are created, or excess shards are destroyed, based on a capacity of the shards 174 to service messages on the stream 172). In some instances, a stream 172 may contain only a single shard. Examples of stream data processing systems known in the art include the AMAZON™ KINESIS™ network service and the APACHE™ KAFKA™ system.

The client devices 102, auxiliary services 106, stream data system 170, and serverless code execution system 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The serverless code execution system 110 and stream data system 170 are depicted in FIG. 1 as operating in a distributed computing environment including several computer systems that are interconnected using one or more computer networks (not shown in FIG. 1). Either or both of the serverless code execution system 110 and stream data system 170 could also operate within a computing environment having a fewer or greater number of devices than are illustrated in FIG. 1. Thus, the depiction of the serverless code execution system 110 and stream data system 170 in FIG. 1 should be taken as illustrative and not limiting to the present disclosure. For example, the serverless code execution system 110 and stream data system 170 or various constituents thereof could implement various Web services components, hosted or "cloud" computing environments, and/or peer to peer network configurations to implement at least a portion of the processes described herein.

Further, the serverless code execution system 110 and stream data system 170 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the serverless code execution system 110 and stream data system 170 are illustrated as connected to the network 104. In some embodiments, any of the components within the serverless code execution system 110 and stream data system 170 can communicate with other components of the serverless code execution system 110 and stream data system 170 via the network 104. In other embodiments, another network (such as a private network not shown in FIG. 1) may enable communication between components within each of the serverless code execution system 110 and stream data system 170 or between those systems.

In FIG. 2, users, by way of client computing devices 102, may interact with the serverless code execution system 110 to provide source code, and establish rules or logic defining when and how such code should be executed on the serverless code execution system 110, thus establishing a "task" or "function." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the serverless code execution system 110, and request that the on serverless code execution system 110 execute the code using one or more execution environments that are managed by the system 110. The serverless code execution system 110 can handle the acquisition and configuration of compute capacity (e.g., containers, instances, etc., which are described in greater detail below) based on the code execution request, and execute the code using the compute capacity. The serverless code execution system 110 may automatically scale up and down based on the volume of request to execute code, thereby relieving the user from the burden of having to worry about over-utilization (e.g., acquiring too little computing resources and suffering performance issues) or under-utilization (e.g., acquiring more computing resources than necessary to run the code, and thus overpaying). In accordance with embodiments of the present disclosure, the functions established by a user may correspond to code executable to implement streaming analytics for data items on the data stream 172, including an aggregation function to generate state information for data items within a time window and a destination function to handle a result corresponding to that time window.

To enable interaction with the serverless code execution system 110, the system 110 includes multiple frontends 120, which enable interaction with the serverless code execution system 110. In an illustrative embodiment, the frontends 120 serve as a "front door" to the other services provided by the serverless code execution system 110, enabling users (via user computing devices 102) to provide, request execution of, and view results of computer executable source code. The frontends 120 include a variety of components to enable interaction between the serverless code execution system 110 and other computing devices. For example, each frontend 120 may include a request interface providing user computing devices 102 with the ability to upload or otherwise communication user-specified code and associated data sets to the serverless code execution system 110 (e.g., in the form of a disk image) and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the source code specified in the request.

References to source code as used herein may refer to any program code (e.g., a program, routine, subroutine, thread, etc.) written in a specific program language. In the present disclosure, the terms "source code," "user code," and "program code," may be used interchangeably. Source code which has been compiled for execution on a specific device is generally referred to herein as "machine code." Both "source code" and "machine code" are representations of the same instructions, which may be collectively referred to as "code." Such code may be executed to achieve a specific function, for example, in connection with a particular web application or mobile application developed by the user. As noted above, individual collections of code (e.g., to achieve a specific function) are referred to herein as "tasks" or "functions," while specific executions of that code are referred to as "task executions," "function executions," "code executions," or simply "executions." Source code for a task may be written, by way of non-limiting example, in JavaScript (e.g., node.js), Java, Python, and/or Ruby (and/or another programming language). Tasks may be "triggered" for execution on the serverless code execution system 110 in a variety of manners. In one embodiment, a user or other computing device may transmit a request to execute a task may, which can generally be referred to as "call" to execute of the task (e.g., a "task call," a "function call," etc.). Such calls may include an identifier of the task to be executed and one or more arguments to be used for executing the task. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

Prior to calling for execution of a function, an end user may submit (e.g., to a frontend 120) code for the function and associated data to be used to execute the function. In one embodiment, the code is provided in the form of a disk image containing the code and other data that the code may use during execution. Illustratively, creation of a function may result in the frontend 120 creating metadata for the function, which defines for example the user creating the function, the disk image used to facilitate execution of the function, trigger conditions for the function, and the like. In one embodiment, functions may be versioned, with function metadata identifying the available versions and at least some other metadata for a function may vary across versions. For example, different versions may be associated with different disk images. Function data and metadata is illustratively stored in the function data store 160. The function data store 160 correspond to any persistent data store. In one embodiment, the function data store 160 is implemented as logical storage on a cloud storage service, such as an object storage system. An example of such an object storage system is AMAZON™'s SIMPLE STORAGE SERVICE™ (or "S3™"). In accordance with embodiments of the present disclosure, user-submitted code may correspond to functions for conducting stream data processing.

After a user has created a function on the serverless code execution system 110, the system 110 may accept calls to execute that function, which may also be referred to as "function invocations." To handle calls to execute a function, the frontend 120 can include an execution queue, which can maintain a record of requested task executions. Illustratively, the number of simultaneous function executions by the serverless code execution system 110 is limited, and as such, new function executions initiated at the serverless code execution system 110 (e.g., via an API call, via a call from an executed or executing function, etc.) may be placed on the execution queue and processed, e.g., in a first-in-first-out order. In some embodiments, the serverless code execution system 110 may include multiple execution queues, such as individual execution queues for each user account. For example, users of the serverless code execution system 110 may desire to limit the rate of function executions on the serverless code execution system 110 (e.g., for cost reasons). Thus, the serverless code execution system 110 may utilize an account-specific execution queue to throttle the rate of simultaneous function executions by a specific user account. In some instances, the serverless code execution system 110 may prioritize function executions, such that function executions of specific accounts or of specified priorities bypass or are prioritized within the execution queue. In other instances, the serverless code execution system 110 may execute functions immediately or substantially immediately after receiving a call for that function, and thus, the execution queue may be omitted.

In addition to functions executed based on explicit user calls and data from auxiliary services 106, the serverless code execution system 110 may in some instances operate to trigger execution of functions independently. For example, the serverless code execution system 110 may operate (based on instructions from a user) to trigger execution of a function at each of a number of specified time intervals (e.g., every 10 minutes).

The frontend 120 can further includes an output interface configured to output information regarding the execution of functions on the serverless code execution system 110. Illustratively, the output interface may transmit data regarding function executions (e.g., results of a function, errors related to the function execution, or details of the function execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a function to transmit an API request to an external service 106 (e.g., to store data generated during execution of the function).

Code executions triggered on the serverless code execution system 110 of FIG. 1 are executed by execution environments hosted by a set of workers 181 within a worker fleet 180. Each worker 181 is illustratively a host device configured to host multiple execution environments, which in FIG. 1 are virtual machine instances 183A-N. Execution environments may alternatively include software containers, sometimes referred to as "OS-level virtualization," another virtualization technology known in the art. Thus, where references are made herein to VM instances 183, it should be understood that (unless indication is made to the contrary) a container may be substituted for such instances 183.

As used herein, the term "virtual machine instance" is intended to refer to an execution of software or other executable code that emulates hardware to provide an environment or platform on which software may execute (an "execution environment"). Due to their emulation of hardware, these virtual machine instances are sometimes referred to as "system virtual machines." Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

As shown in FIG. 1, each worker 181 may host a number of instances 183. Each instance 183 may be isolated from other instances 183, thus ensuring the security of code executions on the serverless code execution system 110. For example, each instance 183 may be divided by a virtualization boundary, by virtue of the instance 183 being a virtual machine hosted by the worker 181. In addition, each instance 183 may exist within a partitioned user space on the worker 181, which logically partitions resources of the worker 181 among instances 183. Each user space may, for example, represent a "chroot" jail—a known isolation technique for LINUX™ operating systems.

To facilitate rapid execution of code, each worker 181 may be configured to maintain a set of instances 183 in a "pre-warmed" state, being at least partially configured to begin execution of code. For example, instances may be created on the worker and configured with access to computing resources (CPU, RAM, drive storage, etc.). In some cases, it may be impractical or impossible to maintain instances 183 in a fully warmed state for all possible code executions, as executions may be associated with a wide variety of at least partially distinct data sets (e.g., disk images and/or snapshots). Thus, instances 183 may be maintained in a "greatest commonality" for a given group of tasks, such as being provisioned with a set of computing resources common to those tasks, being configured to accept an operating system type used by those tasks, etc.

On receiving instructions to provision an instance 183 to support execution of the task, the worker 181 may adjust the configuration of the instance 183 to support that execution. Specifically, the worker 181 may provision the instance 183 with access to a disk image or snapshot corresponding to the task. In some instances, the worker 181 may retrieve the disk image for the task and store the full image locally. In other instances, the worker 181 may provide to an instance 183 what appears to be full local access to the disk image or snapshot, while "lazily" retrieving portions of that image or snapshot in response to a request to read such portions.

Techniques for providing lazy retrieval of image portions are discussed in the U.S. patent application Ser. No. 17/105,250, filed Nov. 25, 2020 and entitled "LOW LATENCY ACCESS TO DATA SETS USING SHARED DATA SET PORTIONS" (the "'250 Application") the entirety of which is hereby incorporated by reference.

In addition, the system 110 includes a number of components for facilitating distribution of calls to execute a function from frontends 120 to particular VM instances 183. For example, the serverless code execution system 110 includes one or more worker managers 140 configured to manage execution environments (e.g., virtual machine instances) hosted by workers 181 among a worker fleet 180. The worker managers 140—each of which are illustratively implemented as physical or virtual-on-physical devices— illustratively "lease" particular VM instances 183 within the fleet 180, thus gaining operational control to, for example, instruct virtual machine instances 183 to execute code of the function. Thus, on receiving a call to execute a function, a frontend 120 may distribute the call to a worker manager 140, which may identify a currently-leased VM instance 183 in which to implement the function, and cause the instance 183 to implement the function.

In the instance that a worker manager 140 does not currently lease a VM instance 183 corresponding to the called function, the worker manager 140 can contact a placement service 160 to request a lease on an additional instance 183, which is illustratively configured to grant to the worker managers 140 leases to individual VM instances 183. Illustratively, the placement service 160 may maintain state information for VM instances 183 across the fleet 180, as well as information indicating which manager 140 has leased a given instance 183. When a worker manager 140 requests a lease on an additional instance 183, the placement service 160 can identify an appropriate instance 183 (e.g., warmed with software and/or data required to support a call to implement a function) and grant to the manager 140 a lease to that instance 183. In the case that such an instance 183 does not exist, the placement service 160 can instruct a worker 181 to create such an instance 183 (e.g., by creating an instance 183 or identifying an existing unused instance 183, providing the instance 183 with access to a required set of data to support execution, etc.) thereafter grant to the worker manager 140 a lease to that instance 183, thus facilitating execution.

To facilitate interaction with external data sources, such as the stream data system 170 or auxiliary services 106, the system 110 including a polling fleet 130, which operates to poll external data sources for data. Illustratively, the polling fleet 130 may include one or more computing devices (shown in FIG. 1 as poller devices 132A-N) configured to periodically transmit a request to the stream data system 170 to retrieve any newly available data (e.g., social network "posts," news articles, files, records, etc.), and to determine whether that data corresponds to a user-established criteria triggering execution a function on the serverless code execution system 110. Illustratively, criteria for execution of a function may include, but is not limited to, whether new data is available at the auxiliary services 106 or the stream data system 170, the type or content of the data, or timing information corresponding to the data.

The poller fleet 130 can be configured to include a dynamic number of poller devices 132A-N (e.g., implemented as virtual machine instances on an underlying computing system), based on the number of message shards 174 within a message stream 172. For example, as shown by the dotted lines of FIG. 1, message shard 174A may correspond to poller device 132A, message shard 174B may correspond to poller device 132B, etc. Thus, as the number of message shards 174 changes (e.g., due to volume of the message stream), the number of poller devices 132 may also change. As such, the poller fleet 130 may be in communication with stream data system 170, and the system 170 may notify the poller fleet 130 of changes to the message shards 174. In such a configuration, each poller device 132A can be configured to poll a message shard 174 to retrieve messages in the sub-stream corresponding to the message shard. The messages may be retrieved individually or in batches (e.g., batches of 10 messages, 50 messages, 100 messages, 500 messages, etc.). Thereafter, the poller device 132 may invoke calls to a serverless function as appropriate for the messages. In some instances, the call from each poller device 132 to corresponding function executions may be made synchronously, such that the poller device 132 waits for confirmation that the execution was successful prior to making a next call.

In accordance with embodiments of the present disclosure, operation of each poller device 132 may be controlled at least in part based on invocation responses provided by executions of serverless functions (e.g., within a VM instance 183). For example, each poller device 132 may initially operate based on a pre-established configuration corresponding, e.g., to the message stream 172 or shard 174. Each invocation of the serverless function may result in execution of serverless code, which in turn provides a response to the poller device 132. This response may include instructions modifying subsequent operation of the poller device 132, such as controlling subsequent serverless function invocations, controlling subsequent retrieval of data items from a corresponding shard 174, or a combination thereof. As discussed above with respect to FIG. 1, this control can provide for implementation of logic that improves efficiency of data stream processing and analysis, such as by avoiding duplicative processing of data items. Moreover, because logic of these controls is implemented within serverless function executions, complexity of poller devices 132 is not unduly increased.

While some functionalities are generally described herein with reference to an individual component of the serverless code execution system 110 or the stream data system 170, other components or a combination of components may additionally or alternatively implement such functionalities. For example, while a poller device 132A may operate to poll a message shard 174 for messages, the message shards 174 may additionally or alternatively be configured to notify the serverless code execution system 110 (e.g., the frontend) of new messages on the shard 174.

Figure 3:
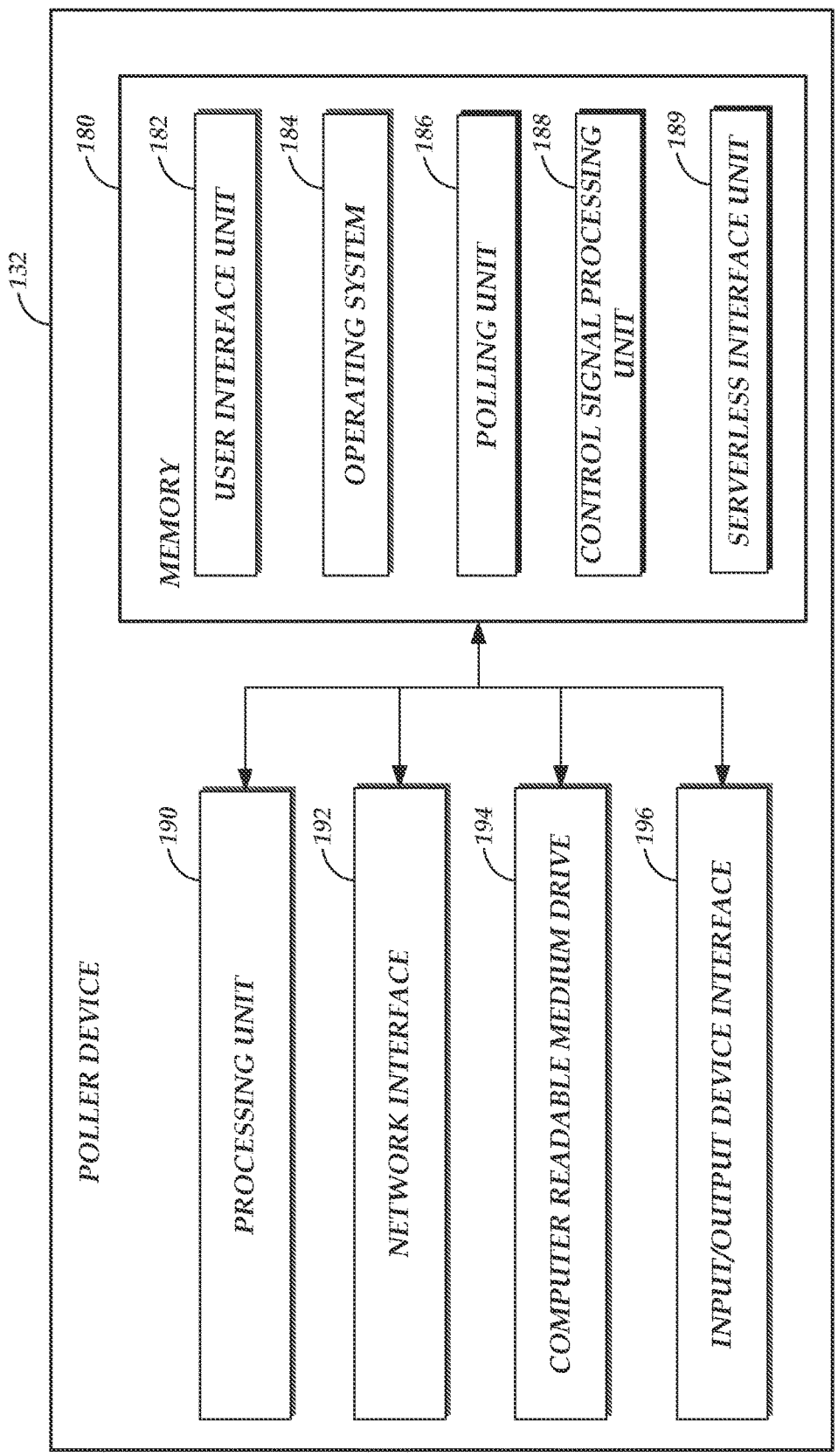
FIG. 3 depicts a general architecture of a computing device providing a polling device of FIG. 2 configured to invoke serverless functions to process data items of a data stream.

FIG. 3 depicts a general architecture of a poller device 132. The general architecture of the poller device 132 depicted in FIG. 3 includes an arrangement of computer hardware and software modules that may be used to implement aspects of the present disclosure. The hardware modules may be implemented with physical electronic devices, as discussed in greater detail below. The poller device 132 may include many more (or fewer) elements than those shown in FIG. 3. It is not necessary, however, that all of these generally conventional elements be shown in order to provide an enabling disclosure. Additionally, the general architecture illustrated in FIG. 3 may be used to implement one or more of the other components illustrated in FIG. 1. As illustrated, the poller device 132 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes random access memory (RAM), read only memory (ROM) and/or other persistent, auxiliary or non-transitory computer readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include a polling unit 186, control signal processing unit 188, and serverless interface unit 189. In one embodiment, the polling unit 186, control signal processing unit 188, and serverless interface unit 189 individually or collectively implement various aspects of the present disclosure. For example, the polling unit 186 can represent code executable to poll a message stream 172 to identify and obtain data items from the stream 172. The serverless interface unit 189 can represent code executable to invoke such a serverless function and pass one or more such data items for processing. The control signal processing unit 188 may obtain and parse responses from such function invocations, including parsing of control signals in such responses that control subsequent operation of the polling unit 186, serverless interface unit 189, or both.

While the polling unit 186, control signal processing unit 188, and serverless interface unit 189 are shown in FIG. 3 as part of the poller device 132, in other embodiments, all or a portion of the polling unit 186, control signal processing unit 188, and serverless interface unit 189 may be implemented by other components of the serverless code execution system 110 and/or another computing device. For example, in certain embodiments of the present disclosure, another computing device in communication with the serverless code execution system 110 may include several modules or components that operate similarly to the modules and components illustrated as part of the poller device 132.

Figure 4:
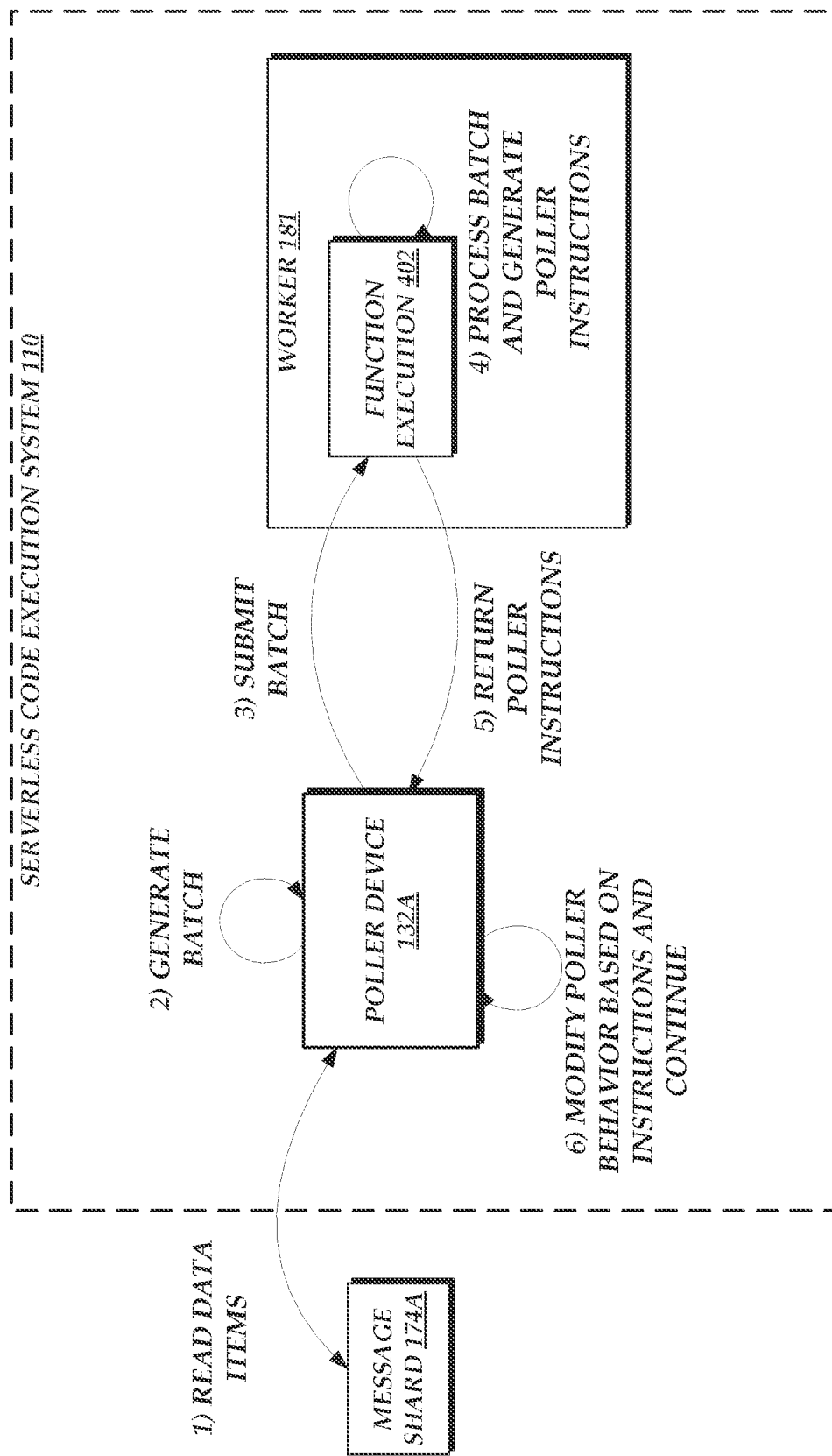
FIG. 4 is a flow diagram depicting illustrative interactions for ingesting data items from a data stream into a serverless function execution, and using the serverless function execution to control subsequent ingestion.

With reference to FIG. 4, illustrative interactions are depicted for controlling operation of a poller device 132 via a serverless function execution, thus controlling ingestion of data items from a data stream to executions of the serverless function. Specifically, FIG. 4 depicts operation of a poller device 132A reading from a message shard 174A. Similar interactions may occur, potentially concurrently, for each shard of a stream. It is assumed in FIG. 4 that a user has previously established a data stream on a stream data system 170, and published data items to the stream. It is further assumed that the user has configured a serverless function on the serverless code execution system 110, such as by uploading code of the function to a frontend 120, and provided an initial configuration of poller devices 132 to read data items from the data stream and, in turn, invoke the serverless function. For example, the user may configure the serverless code execution system 110 by providing an identifier of the data stream, an identifier of the serverless function, a read batch size for the poller devices 132, an invocation batch size for the devices 132, pre-configured error handling parameters (e.g., a retry limit, whether to bisect on failure, etc.), and the like.

As shown in FIG. 4, the poller device 132A therefore, at (1), reads a set of data items from the message shard 174. For example, the poller device 132A may periodically communicate with the message shard 174 and read a next n data items from the shard 174. While FIG. 4 depicts reading of data items as part of interactions also involving serverless function invocation, and also notes an illustrative ordering of such interactions, in some cases a poller device 132A may implement reading of data items from a shard 174A as a separate and independent process. Accordingly, reading of data items may occur in parallel with submission of those data items for processing by a serverless function.

In order to process data items from the message shard 174A, the poller device 132A, and (2), generates a batch of data items. Illustratively, the poller device 132A may combine a next n data items read from the shard 174A and not yet successfully processed by the serverless function, where n is a pre-configured invocation batch size for the poller device 132A.

Thereafter, at (3), the poller device 132A submits the batch size to a function execution 402A, on a worker 181, for processing. While FIG. 4 depicts the poller device 132A directly submitting the batch to the function execution 402, different communication paths may occur in practice. For example, the poller device 132A may submit a function call to a frontend 120, including as parameters for the call the batch of data items to be processed. The frontend 120 may in turn distribute the call to a worker 181 in accordance with operation of the serverless code execution system 110. Thus, a poller device 132A may not be required, for example, to maintain addressing information for the worker 181, and the serverless code execution system 110 can be enabled to distribute function calls appropriately to operation of that system 110.

At (4), the function execution 402 processes the batch of data items according to logic within code of the function. The logic may include any of a variety of types of processing and analytics for streaming data, such as aggregating data, validating data, evaluating data for certain conditions, etc. In accordance with embodiments of the present disclosure, the logic may further generate poller instructions that control subsequent operation of the poller device 132A with respect to reading data items, serverless function invocations to process data items, or a combination thereof.

In one embodiment, the poller instructions are based at least in part on current processing of the function execution 402. For example, if the execution 402 successfully processes one or more data items from a submitted batch, the execution 402 may generate instructions indicating that the one or more data items should not be resubmitted. In the instance that data stream processing proceeds linearly, the instructions may indicate, for example, a location within the data stream at which to begin submitting data items within subsequent invocations. In the instance that processing does not require linearity, the instructions may indicate, for example, specific data items to be resubmitted or not resubmitted. As another example based on current processing, a function execution 402 may determine that a batch size should be changed. For example, an execution 402 may be configured to target a given execution time, which may be set by a programming of the function based on parameters such as a maximum allowed execution time, overhead for each execution, mean time to conduct processing of each data item, and the like. The execution 402 may monitor present execution time with respect to a batch, and increase or decrease the invocation batch size based on the execution time, such as by increasing batch size to extend execution time or decreasing batch size to reduce execution time. As discussed above, the poller device 132A may implement these instructions such that subsequent operation of the poller device 132A is modified according to the logic implemented in the function execution 402.

In another embodiment, the poller instructions may be based at least partly on information regarding configuration or past operation of the poller device 132, which may be passed to the function execution 402 along with the batch of data items. For example, when resubmitting a data item within a batch, the poller device 132A may indicate for each data item a number of prior submissions of the data item to a function execution, timing of such submissions, results associated with such submissions, and the time. The function execution 402 may utilize this information (or, in the case of newly tried data items, the absence of such information) to determine whether, and potentially how, the data item should be resubmitted in subsequent calls, if a current processing of the data item does not succeed. In this manner, the function execution 402 may implement custom "retry logic" controlling whether and how data items are resubmitted. Similarly, metadata regarding operation of the poller device 132A, such as a rate of detecting new data items on the shard 174A, a number of data items read by the device 132A and not yet processed (e.g., a "backlog"), a rate of function invocation, and the like may be passed to a function execution, which the execution may process to generate poller instructions modifying a variety of operational aspects of the poller device 132A. Accordingly, a variety of potentially complex logic may be implemented at the function execution 402 to control operation of the poller device 132A.

As shown in FIG. 4, on generating instructions, the instructions are returned to the poller device 132A at (5). The poller device 132A, at (6), then modifies poller behavior based on the instructions, and continues operation. Modification may include any of a variety of changes instructed by the function execution 402, such as beginning a subsequent batch at a specific location in a stream, not resubmitting individual data items, modifying read behavior, modifying invocation batch size, etc. Continued operation may include subsequent reading of data from a shard 174A, generation of batches, submission of batches as serverless function invocations, and modifications of subsequent operations, similar to interactions (1)-(6) of FIG. 1. Thus, the interactions of FIG. 4 may occur multiple times in order to implement data stream processing. Notably, the interactions can be used to implement complex control of the poller device 132A without requiring control logic to be implemented on the device 132, and without inhibiting various benefits of the serverless code execution system 110. For example, the interactions of FIG. 4 may not require that the worker 181 be static among multiple instances of these interactions; rather, various executions 402 may occur on different workers 181, providing flexibility on the serverless code execution system 110 as to placement of function executions 402. Similarly, the logic implemented on each function execution 402 can be invoked on-demand, thus incurring resource costs only as necessary and enabling rapid scaling up and down to meet demand imposed by the volume of messages on a message stream. The interactions of FIG. 4 can thus provide for more efficient ingestion of streaming data to serverless function executions.

Figure 5:
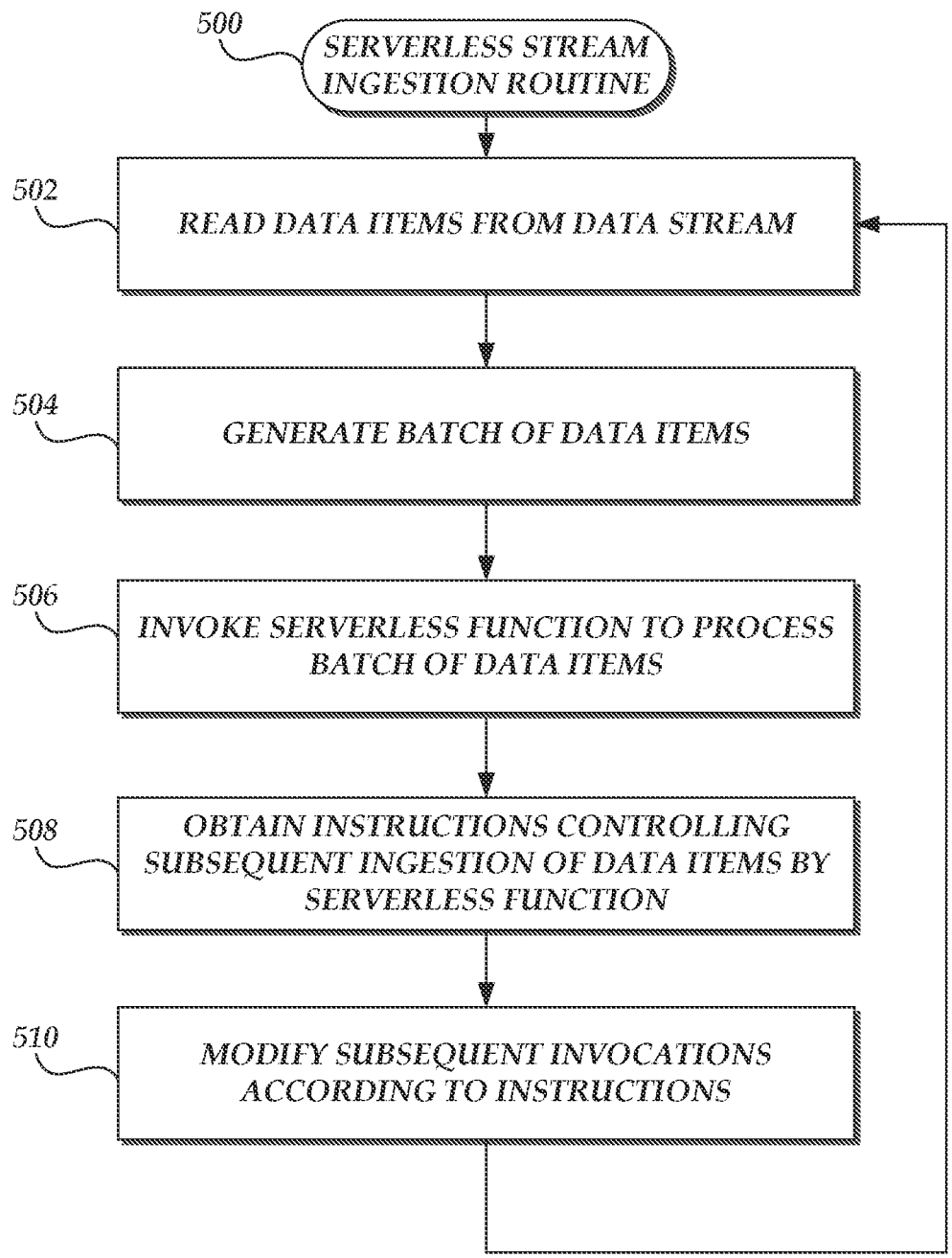
FIG. 5 is an illustrative routine for controlling ingestion of data items from a data stream to a serverless function based on instructions obtained in response to invocations of the serverless function.

With reference to FIG. 5, an illustrative routine 500 will be described for controlling ingestion of a data stream into a serverless function executing on a serverless code execution system. The routine 500 may be implemented, for example, on a poller device 132 of a poller fleet 130.

The routine 500 begins at block 502, where the poller device 132 obtains reads data items from a data stream. As discussed above, a stream may include a set of data items arranged, e.g., according to a time of publication to the stream. The poller device 132 may interact with a host device hosting the stream to retrieve a set of data items. In one embodiment, the poller device 132 iteratively retrieves data items such as by requesting new data items every n seconds. Retrieval of data items may be referred to as "pulling" data items from the data stream. In another embodiment, a host device hosting a data stream may be configured to "push" data items to a poller device 132, by notifying the device 132 when new data items are available. In some configurations, a poller device 132 may have a maximum cache capacity for read data items that have not yet been successfully processed by a serverless function. Accordingly, when the data stream contains more unprocessed data items than the cache capacity, the poller device 132 may be configured to read up to the maximum number of unprocessed data items from the stream and store such read data items in the data cache. As discussed above, the poller device 132 illustratively maintains a read pointer indicating a last read data item from the stream by reference to a location of that data item in the stream (e.g., as a data item number, where data items are sequentially numbered within the stream). In cases where processing may be non-linear, a poller device 132 may maintain a data map indicating read data items from a stream.

While reading of data items from a data stream is described as part of the routine 500, in some embodiments a poller device 132 may implement separate routines for reading from a data stream and for submitting read data items to a serverless function execution. Accordingly, block 502 may form all or part of a first routine, and the remaining blocks of FIG. 5 may form all or part of a second routine.

At block 504, the poller device 132 generates a batch of data items from those read from the data stream. Illustratively, the batch can include a number of data items controlled by a batch size, which may be a configuration parameter of the poller device 132. The batch size may be set, for example, based on an expected processing rate of a serverless function used to process the data items (e.g., such that the latency in processing individual data items is within an expected range, such that executions of the serverless function are expected to finish in a given time, etc.). Each batch may include one or more data items read from the stream and unprocessed by a corresponding serverless function. For example, the batch may include a first unprocessed data item and one or more subsequent data items, up to the number of data items controlled by the batch size or a most recent data item in the stream. In instances where linear processing is not required, a batch may include another selection of unprocessed data items, such as a randomly selected set of unprocessed data items or a set selected according to various grouping parameters for a batch (e.g., meeting a target batch data size, meeting criteria for combining different types of data items, etc.). As discussed above, the poller device 132 may illustratively maintain a pointer to a location in the data stream of a last processed data item. In cases where processing may be non-linear, a poller device 132 may maintain a data map indicating processed data items from a stream.

At block 506, the poller device 132 invokes a serverless function to process the batch of data items. The particular serverless function may be set according to a configuration parameter of the poller device 132. For example, a user that created a serverless function on the serverless code execution system 110 may specify that the function should be invoked based on data items within the data stream, and as such, the system 110 may instantiate a poller device 132 to read from the stream and invoke the serverless function. Invocation of serverless functions is discussed in more detail above, but in brief, invocation may include submitting a call to the serverless code execution system 110 (e.g., to a frontend 120) that identifies the serverless function being invoked as well as the batch of data items. For example, the call may pass the batch of data items as a parameter in the call, or pass other information identifying the batch of data items (e.g., as locations in the data stream, such that the function may read the batch from the stream). As discussed above, the system 110 can respond to the invocation by executing the serverless function within an execution environment of the system 110 (e.g., a VM instance 183). Accordingly, code of the serverless function can execute to conduct any processing of the data items within the data stream designated within that code.

In accordance with embodiments of the present disclosure, code of the serverless function can further execute to generate instructions controlling subsequent ingestion of data items from the stream by the serverless function. Illustratively, to enable complex error-handling, the serverless function may generate instructions indicating how data items should be selected for a subsequent batch, such as a location in the data stream from which to begin forming the batch (or equivalently a location in the data stream of a last data item for which processing completed, indicating that a subsequent batch should begin from a subsequent location in the data stream), one or more data items to exclude from a subsequent batch, etc. The instructions may additionally or alternatively control various other attributes of the poller device 132 related to ingestion of data items to the serverless function, such as an instruction to modify a timing of a subsequent invocation of the serverless function, an instruction to modify a number of data items to include in a subsequent batch, or an instruction to modify reading of data items from the data stream (e.g., modifying which items are read, a timing of reads, a number of data items to read, etc.). Still further, the instructions may additionally or alternatively control other functionalities or attributes of the poller device 132, such as a location to which the device 132 submits monitoring information. Accordingly, code within the serverless function is enabled to control a variety of aspects of operation of the poller device 132, enabling complex functionality to be implemented at the device 132 without requiring logic to implement that functionality to be executed on the device 132.

In one embodiment, to facilitate generation of instructions by a serverless function, the invocation of the function can include or indicate metadata regarding prior or current operation of the poller device 132. For example, an invocation may indicate, for each data item in a batch, whether (and potentially how many times) the data item has been previously submitted in an invocation of the function. Such information may illustratively enable various "retry logic" at the function, enabling the function to specify when a data items should be resubmitted in a subsequent invocation without requiring static retry logic to be implemented at the poller device 132. In other examples, an invocation may indicate information such as a number of cached (e.g., read but not yet processed) data items at the poller device 132, results of prior invocations, timing of prior invocations, parameters of the poller device 132, rates of new data items occurring in the data stream, or the like. Code of a serverless function may utilize this various metadata to generate instructions controlling subsequent operation of the poller device 132, thus facilitating potentially complex logic to control ingestion of data items into the serverless function.

At block 508, the poller device 132 obtains the instructions from the execution of the serverless function. For example, the invocation of block 506 may be a synchronous invocation, such that serverless code execution system 110 delays a response until execution of the function completes. The instructions may therefore be obtained in the response. In another example, the invocation of block 506 may be asynchronous, such that a response acknowledging the invocation is received potentially before a corresponding execution occurs. In this example, the function may separately submit instructions to the poller device 132.

At block 510, the poller device 132 modifies subsequent invocations according to the instructions. For example, the poller device 132 may generate a subsequent batch of data items by include in the subsequent batch data items from the stream beginning at a location in the stream identified within the instructions, which location may illustratively represent a first not-yet-processed data item within the stream. In other examples, the poller device 132 may generate subsequent batches by modifying its operation according to other instructions, such as by modifying a timing (e.g., a cadence) of subsequent invocations of the serverless function, modifying a number of data items in the subsequent batch, etc. Additionally or alternatively, the poller device 132 may modify subsequent reads of data items from the stream, such as by modifying which items are read, a timing of reads, a number of data items to read, etc. The routine 500 then returns to block 502, where the poller device 132 can continue to operate according to the modified operation.

The routine 500 is depicted in FIG. 5 as an "infinite loop" indicating that the routine 500 may continue during a lifetime of the poller device 132. Illustratively, the device 132 may continue to operate while new data items are published to a data stream, or until the device 132 is halted by an owner of the device 132 (e.g., based on instructions of an end user).

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
   iteratively retrieving data items from a data stream;
   generating a first batch of data items including one or more data items retrieved from the data stream;
   requesting invocation of a serverless function to process the first batch of data items;
   obtaining, from an execution of the serverless function, instructions controlling subsequent ingestion of data items from the data stream by executions of the serverless function, the instructions including an instruction to generate a subsequent batch of data items by resubmitting a portion of the one or more data items in the first batch of data items beginning at a location in the first batch of data items identified within the instructions; and
   modify subsequent invocations of the serverless function according to the instructions, wherein modifying the subsequent invocations of the serverless function according to the instructions comprises:
      generating the subsequent batch of data items for processing by the serverless function by resubmitting a portion of the one or more data items in the first batch of data items beginning at the location in the first batch of data items identified within the instructions; and
      requesting a second invocation of the serverless function to process the subsequent batch of data items.

2. The computer-implemented method of claim 1, wherein requesting invocation of the serverless function comprises passing to the execution of the serverless function metadata regarding past ingestion of data items from the data stream by executions of the serverless function.

3. The computer-implemented method of claim 2, wherein the metadata regarding past ingestion of data items from the data stream by executions of the serverless function comprises an indication of how many times at least one data item from the first batch of data items has been passed to the serverless function.

4. The computer-implemented method of claim 1, wherein the location in the data stream is identified within the instructions by at least one of inclusion of the location within the instructions or inclusion within the instructions of an immediately preceding location.

5. The computer-implemented method of claim 1, wherein requesting invocation of the serverless function to process the first batch of data items comprises passing the first batch of data items as a parameter within the invocation of the serverless function.

6. The computer-implemented method of claim 1, wherein the instructions controlling subsequent invocations of the serverless function further comprise an instruction controlling a timing of a subsequent invocation of the serverless function, and wherein modifying the subsequent invocations of the serverless function according to the instructions further comprises requesting the subsequent invocation according to the timing.

7. The computer-implemented method of claim 1, wherein the instructions controlling subsequent invocations of the serverless function further comprise an instruction to exclude one or more data items from the subsequent batch, and wherein modifying the subsequent invocations of the serverless function according to the instructions further comprises omitting the one or more data items indicated in the instructions from the subsequent batch.

8. The computer-implemented method of claim 1, wherein the instructions further comprise instructions to modify subsequent iterative retrieval of data items from the data stream, and wherein the computer-implemented method further comprises modifying subsequent iterative retrieval of the data items from the data stream according to the instructions.

9. The computer-implemented method of claim 8, wherein the instructions to modify subsequent iterative retrieval of data items from the data stream comprise one or more of an instruction to modify an identifier of the data stream, an instruction to modify which data items are read from the data stream, an instruction to modify a number of data items read from the data stream per retrieval, or an instruction to modify a frequency of iterative retrievals.

10. One or more non-transitory computer-readable media comprising instructions that, when executed by a computing system, causes the computing system to:
   iteratively retrieve data items from a data stream;
   generate a first batch of data items including one or more data items retrieved from the data stream;
   request invocation of a serverless function to process the first batch of data items;
   obtain, from an execution of the serverless function, instructions controlling subsequent ingestion of data items from the data stream by executions of the serverless function, the instructions including an instruction to generate a subsequent batch of data items by resubmitting a portion of the one or more data items in the first batch of data items beginning at a location in the first batch of data items identified within the instructions;

modify subsequent invocations of the serverless function according to the instructions, wherein modifying the subsequent invocations of the serverless function according to the instructions comprises:

generating the subsequent batch of data items for processing by the serverless function by resubmitting a portion of the one or more data items in the first batch of data items beginning at the location in the first batch of data items identified within the instructions; and requesting a second invocation of the serverless function to process the subsequent batch of data items.

11. The one or more non-transitory computer-readable media of claim 10, wherein to request invocation of the serverless function, the instructions cause the computing system to pass to the execution of the serverless function metadata regarding past ingestion of data items from the data stream by executions of the serverless function.

12. The one or more non-transitory computer-readable media of claim 10, wherein the instructions controlling subsequent invocations of the serverless function further comprise an instruction controlling a timing of a subsequent invocation of the serverless function, and wherein modifying the subsequent invocations of the serverless function according to the instructions further comprises requesting the subsequent invocation according to the timing.

13. The one or more non-transitory computer-readable media of claim 10, wherein the instructions controlling subsequent invocations of the serverless function further comprise an instruction to exclude one or more data items from the subsequent batch, and wherein modifying the subsequent invocations of the serverless function according to the instructions further comprises omitting the one or more data items indicated in the instructions from the subsequent batch.

14. The one or more non-transitory computer-readable media of claim 10, wherein the instructions controlling subsequent invocations of the serverless function further comprise an instruction to modify a number of data items included in the subsequent batch, and wherein generating the subsequent batch of data items to include the number of data items indicated within the instructions.

15. The one or more non-transitory computer-readable media of claim 10, wherein the instructions further comprise instructions to modify subsequent iterative retrieval of data items from the data stream, and wherein the instructions further cause the computing system to modify subsequent iterative retrieval of the data items from the data stream according to the instructions.

16. The one or more non-transitory computer-readable media of claim 15, wherein the instructions to modify subsequent iterative retrieval of data items from the data stream comprise one or more of an instruction to modify an identifier of the data stream, an instruction to modify which data items are read from the data stream, an instruction to modify a number of data items read from the data stream per retrieval, or an instruction to modify a frequency of iterative retrievals.

17. The one or more non-transitory computer-readable media of claim 10, wherein the instructions further comprise instructions to submit a completion notification regarding processing of data items from the data stream to a location specified in the instructions, and wherein the instructions further cause the computing system to transmit the completion notification to the location.

18. A system comprising:

a data store storing computer-executable instructions; and a processor configured to execute the computer-executable instructions, wherein the computer-executable instructions, when executed, cause the system to:

iteratively retrieve data items from a data stream;

generate a first batch of data items including one or more data items retrieved from the data stream;

request invocation of a serverless function to process the first batch of data items;

obtain, from an execution of the serverless function, instructions controlling subsequent ingestion of data items from the data stream by executions of the serverless function, the instructions including an instruction to generate a subsequent batch of data items by resubmitting a portion of the one or more data items in the first batch of data items beginning at a location in the first batch of data items identified within the instructions; and modify subsequent invocations of the serverless function according to the instructions, wherein modifying the subsequent invocations of the serverless function according to the instructions comprises:

generating the subsequent batch of data items for processing by the serverless function by resubmitting a portion of the one or more data items in the first batch of data items beginning at the location in the first batch of data items identified within the instructions; and requesting a second invocation of the serverless function to process the subsequent batch of data items.

19. The system of claim 18, wherein the processor corresponds to a poller device, and wherein the system further comprises a serverless code execution system configured to obtain the request for invocation of the serverless function and in response initiate the execution of the serverless function, wherein the execution of the serverless function causes the serverless code execution system to:

obtain the first batch of data items;

iteratively process data items within the first batch to successfully process a first portion of the first batch of data items;

determine a location in the data stream corresponding to a first unsuccessfully processed data item in the first batch;

generate the instructions, the instructions including an instruction to generate a subsequent batch of data items by including data items from the data stream beginning at the location in the data stream corresponding to the first unsuccessfully processed data item in the first batch; and respond to the request for invocation of the serverless function by returning the instructions to the poller device.

20. The system of claim 18, wherein the processor corresponds to a poller device, wherein the data stream is divided into a plurality of shards, wherein the poller device is associated with a first shard of the plurality of shards, and wherein the one or more data items retrieved from the data stream correspond to one or more data items retrieved from the first shard.

21. The system of claim 18, wherein the instructions comprise an instruction controlling a timing of a subsequent invocation of the serverless function, and wherein modifying subsequent invocations of the serverless function according to the instructions further comprises requesting the subsequent invocation according to the timing.

22. The system of claim 18, wherein the instructions comprise an instruction to exclude one or more data items from the subsequent batch, and wherein modifying subsequent invocations of the serverless function according to the instructions further comprises omitting the one or more data items indicated in the instructions from the subsequent batch.

* * * * *